United States Patent [19]
Ellis et al.

[11] Patent Number: 5,491,740
[45] Date of Patent: Feb. 13, 1996

[54] AUTOMATED KEY ACTUATING CELLULAR TELEPHONE PROGRAMMER

[75] Inventors: Roy D. Ellis; Steven E. Maurath, both of Santa Ana, Calif.

[73] Assignee: Activator Systems, Inc., Tustin, Calif.

[21] Appl. No.: 144,184

[22] Filed: Oct. 27, 1993

[51] Int. Cl.$^6$ .................................................. H04Q 7/32
[52] U.S. Cl. .................... 379/58; 379/59; 379/358
[58] Field of Search ................ 240/825.44, 825.49; 379/56, 58, 59, 358; 455/31.1, 33.1, 59, 67.1

[56] References Cited

U.S. PATENT DOCUMENTS

| | | | |
|---|---|---|---|
| 1,523,364 | 1/1925 | Batchelder . | |
| 1,927,413 | 9/1933 | Morin ........................... | 379/358 |
| 2,088,065 | 7/1937 | Holden et al. ................. | 379/358 |
| 3,194,893 | 7/1965 | Auel . | |
| 3,360,612 | 12/1967 | Klumb et al. .................. | 379/358 |
| 3,778,553 | 12/1973 | Rackman . | |
| 3,882,337 | 5/1975 | Pfeffer et al. . | |
| 3,903,376 | 9/1975 | Nishikiori . | |
| 4,010,330 | 3/1977 | Shio . | |
| 4,283,764 | 8/1981 | Crum et al. . | |
| 4,612,996 | 9/1986 | Wolf et al. . | |
| 4,664,590 | 5/1987 | Maekawa . | |
| 4,669,390 | 6/1987 | Bisiach . | |
| 4,745,812 | 5/1988 | Amazeen et al. . | |
| 4,836,111 | 6/1989 | Kaufmann . | |
| 4,875,823 | 10/1989 | Fuse et al. . | |
| 4,958,368 | 9/1990 | Parker . | |
| 4,982,611 | 1/1991 | Lorenz et al. . | |
| 5,046,082 | 9/1991 | Zicker et al. . | |
| 5,187,744 | 2/1993 | Richter . | |
| 5,297,192 | 3/1994 | Gerszberg ..................... | 379/59 |
| 5,301,223 | 4/1994 | Amadar et al. ................ | 379/58 |
| 5,325,418 | 6/1994 | McGregor et al. ............ | 379/59 |

FOREIGN PATENT DOCUMENTS

| 0064854 | 4/1983 | Japan .............................. | 379/358 |

*Primary Examiner*—Curtis Kunta
*Assistant Examiner*—William Cumming
*Attorney, Agent, or Firm*—Knobbe, Martens, Olson & Bear

[57] ABSTRACT

The present invention relates to an automated programmer for actuating a sequence of keys on a handset of a cellular telephone, as required by manufacturer instructions, to initialize the telephone for operation in a cellular system. The programmer comprises a pair of pusher members for actuating the keys on the keypad, and a holder for securing the handset above the pusher members. The holder is adjustable in three dimensions to allow securing of handsets of various shapes and sizes. Also, each pusher member is controlled by a driver, which can move the pusher member to any location within a three dimensional space. This allows the programmer to actuate the keys on different cellular telephones having a variety of handset shapes and sizes, and a variety of keypad configurations. Two pushers are provided to allow the programmer to depress two keys simultaneously, as required by some cellular telephones. The programmer also has a programming module for determining an appropriate key sequence and for determining the physical location of each of the keys of the particular model of cellular telephone. In addition, the programmer has the capability of sensing contact between the pusher member and other surfaces for error checking purposes.

25 Claims, 16 Drawing Sheets

AUTOMATED KEY ACTUATING CELLULAR TELEPHONE PROGRAMMER

BACKGROUND OF THE INVENTION

1. Field of the Invention

The present invention is in the field of automated programmers for actuating keys on a cellular telephone keypad in a predefined sequence to initialize the telephone for operation in a cellular system. In particular, the present invention relates to an automated programmer that can be adapted to program a wide variety of cellular telephones having handsets of various shapes and sizes, with varying keypad configurations.

2. Description of the Related Art

Before a newly purchased cellular telephone can be used in a cellular system, it must be programmed with certain operating parameters, such as a telephone number and a number of selection codes for options related to the operation of the cellular telephone. Existing procedures for programming this information into a cellular telephone are generally very time-consuming and labor intensive. Typically, a clerk at the point of purchase will press between 30 and 100 or more keys on the keypad of the telephone in a predefined sequence, which is different for each model of cellular telephone. Sometimes, multiple keys must be actuated simultaneously. Because of the large number of variables, it is impractical to commit the sequences to memory, and the clerk will typically have to continually refer to a manual to determine the prescribed sequence. Needless to say, this procedure is very prone to errors.

One automated system for programming a cellular telephone is shown in U.S. Pat. No. 5,046,082, issued to Zicker, et al. on Sep. 3, 1991. This patent discloses a system which allows a cellular telephone to be remotely programmed. The cellular telephone receives programming information over the public switched telephone network in the same general manner in which it receives ordinary voice and data signals. However, cellular telephones presently have no remote programming capabilities. In addition, there are substantial security concerns with allowing remote access to the programming parameters of a cellular telephone.

SUMMARY OF THE INVENTION

The present invention comprises an automated key actuating cellular telephone programmer. In use, the handset of a cellular telephone is placed into a holder in the programmer with a keypad on the handset of the telephone facing down into the programmer. The holder is preferably configured to secure handsets of various shapes and sizes above one or more pusher members that actuate keys on the keypad. Multiple pusher members are advantageous to allow simultaneous actuation of multiple keys. Each pusher member is controlled by a driver which moves the pusher member in three spacial dimensions. In the preferred embodiment, the driver positions the corresponding pusher member at a selected location within a horizontal two-dimensional range beneath the keypad of the cellular telephone, and then vertically moves the tip of the pusher member to a position adjacent to or on a key of the keypad. Preferably, the three dimensional range is selected to allow programming of cellular telephones with a wide variety of shapes and sizes and with a wide variety of keypad configurations. In one embodiment, the programmer programs at least five different models of cellular telephones with varying handset shapes and sizes, and varying keypad configurations.

The programmer of the preferred embodiment also comprises a programming module that will determine the movements required of the pusher members to program the particular model of cellular telephone with the desired information. The programming module preferably comprises a memory that contains model-specific programming information for different models of cellular telephones. This information includes programming instructions and physical key locations. Additionally, the programming module also typically receives user-specific programming information from a host computer. This information includes the telephone number to be used for the specific telephone to be programmed and selection codes for various programming options. With this information, the programming module determines the sequence and physical location of keys that must be actuated to program the particular model of cellular telephone with the desired operating parameters. The programming module will then instruct the drivers to move the pusher members to the correct locations to actuate the appropriate keys.

The preferred embodiment also has a capability of sensing contact between the tip of the pusher member and other surfaces. Preferably, the driver moves the pusher member in a vertical direction with a minimal force, so that the pusher member stops moving upon contact with another surface. The driver then determines the vertical position of the pusher member. If the pusher member makes contact with a surface at a location at which there should be no surface, or if the pusher does not make contact with a surface at a location at which there should be a surface, then the automated programmer will abort the programming process and alert the operator. This will allow the operator to verify appropriate aspects of the setup of the automated programmer, such as the position and orientation of the handset in the holder, as well as the model number of the cellular telephone to be programmed, and take corrective action.

One aspect of the present invention is a cellular telephone programmer for actuating keys on a handset of a cellular telephone in a prescribed sequence to prepare the telephone for operation in a cellular system. The programmer comprises a memory for retaining programming information related to the model of cellular telephone to be programmed; a pusher member for mechanically actuating a plurality of keys on the handset of the cellular telephone; a holder for securing the handset in a position that enables the pusher member to actuate keys on the handset; a driver that is attached to the pusher member; and a programming module electrically connected to the driver. The programming module retrieves programming information from the memory and instructs the driver to move the pusher member to press keys on the handset in accordance with the prescribed sequence.

Another aspect of the present invention is a cellular telephone programmer that comprises a pusher member for mechanically actuating keys on the handset of a cellular telephone; a driver that is attached to the pusher member; and a programming module connected to the driver which generates electrical signals to control the driver to move the pusher member to actuate keys on the handset. The driver drives the pusher member in three spatial dimensions to allow the pusher member to sequentially actuate multiple keys on any of a plurality of different handsets corresponding to different models of cellular telephones, where the different handsets have different keypad configurations Another aspect of the present invention is a cellular telephone programmer that comprises a pusher member for actuating keys on the handset of the cellular telephone; means for sensing contact between the pusher member and another surface; a driver attached to the pusher member; and a programming module to control the driver to move the pusher member to actuate keys on the handset. The programming module is responsive to the means for sensing contact between the pusher member and another surface.

Another aspect of the present invention is a cellular telephone programmer comprising a pusher member for actuating keys on the handset of the cellular telephone; a driver attached to the pusher member; a programming module which generates electrical signals to control the driver to move the pusher member to actuate keys on the handset; and a holder adapted to secure any of a variety of cellular telephone handsets in a position that enables the pusher to actuate keys on the handset.

Another aspect of the present invention is an apparatus for programming any cellular telephone within a group of cellular telephones that have dissimilar handset configurations. The apparatus comprises a pusher member adapted to mechanically actuate keys on the handset of any cellular telephone within the group of cellular telephones and a handset holder. The handset holder has at least one member which applies a retention force to the handset such that the handset is retained in a fixed position during actuation of the keys by the pusher member. Also, the holder is configured to apply the retention force to the handset of any cellular telephone within the group of cellular telephones.

Still another aspect of the present invention is an apparatus for programming a selected cellular telephone within a group of cellular telephones. The apparatus comprises a first pusher member configured to depress keys of the telephones; and a second pusher member configured to depress keys of the telephones. Each of the pusher members is mounted (i) for rotation along an arc, and (ii) for translation in each of two generally orthogonal directions.

Another aspect of the present invention is a method of programming cellular telephones comprising the steps of: (a) providing a first cellular telephone having a handset with a keypad; (b) mechanically actuating keys of the keypad by: (1) mounting the handset in a holder; and (2) using a pusher member to depress keys of the keypad in a prescribed sequence; (c) providing a second cellular telephone having a handset of different dimensions than the handset of the first telephone and a keypad of a different configuration than the keypad of the first telephone; and (d) utilizing the holder and the pusher member to perform step (b) on the second telephone.

DETAILED DESCRIPTION OF THE PREFERRED EMBODIMENT

Figure 1:
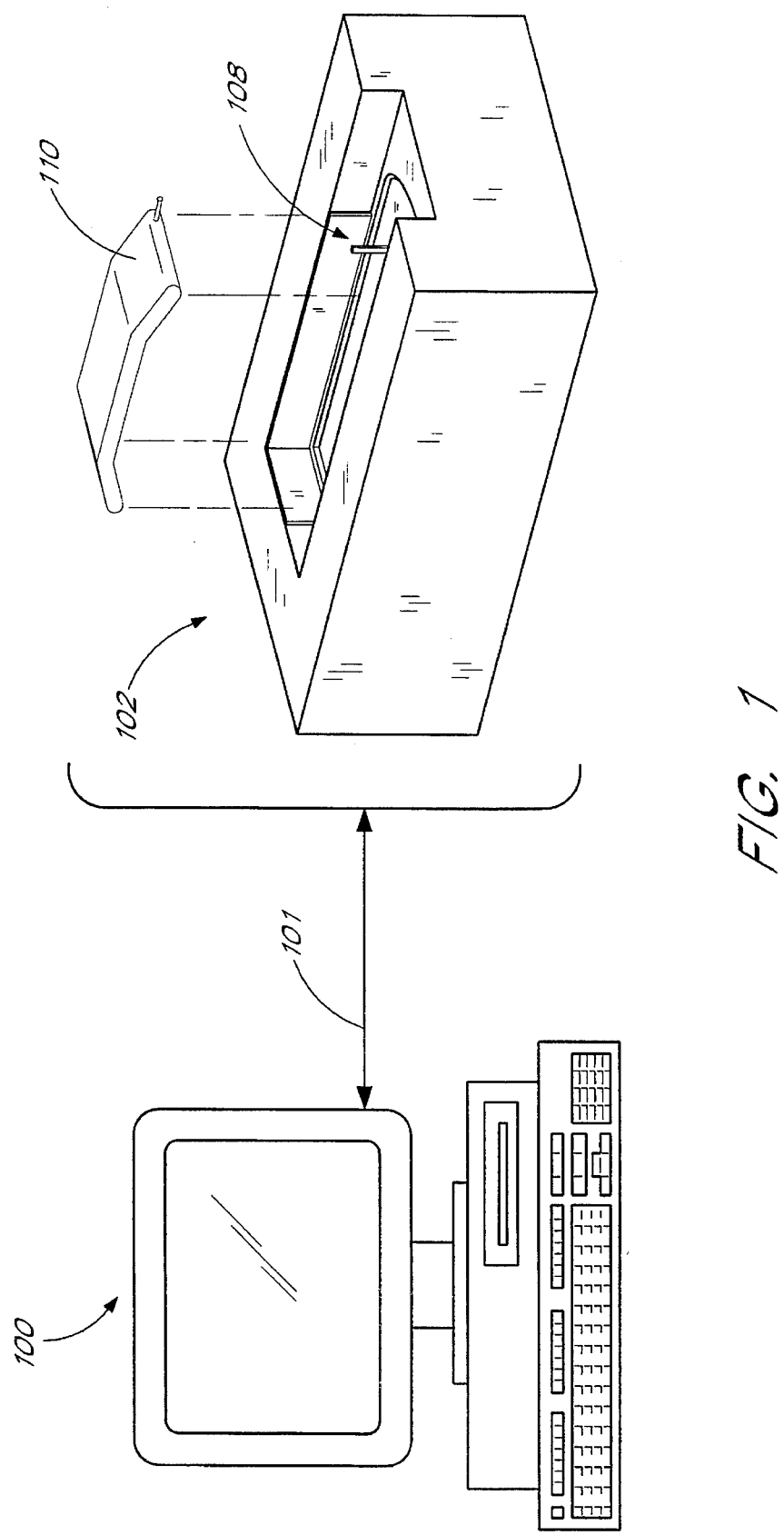
FIG. 1 illustrates a cellular telephone programmer of the present invention, along with a host computer and a handset of a cellular telephone.

As shown in FIG. 1, an automated key actuating cellular telephone programmer 102 comprises a holder 108 for receiving and securing a handset 110 of a cellular telephone. The programmer 102 is connected to a host computer 100 via a line 101. In FIG. 1, the host computer 100 is depicted as an ordinary personal computer, with a keyboard and monitor. However, a wide variety of other devices, such as a mainframe computer, could also function as the host computer 100. For the arrangement shown in FIG. 1, the line 101 provides a serial interface between a serial port on the programmer 102 and a serial port on the host computer 100. Other interfaces can also be used.

Figure 2:
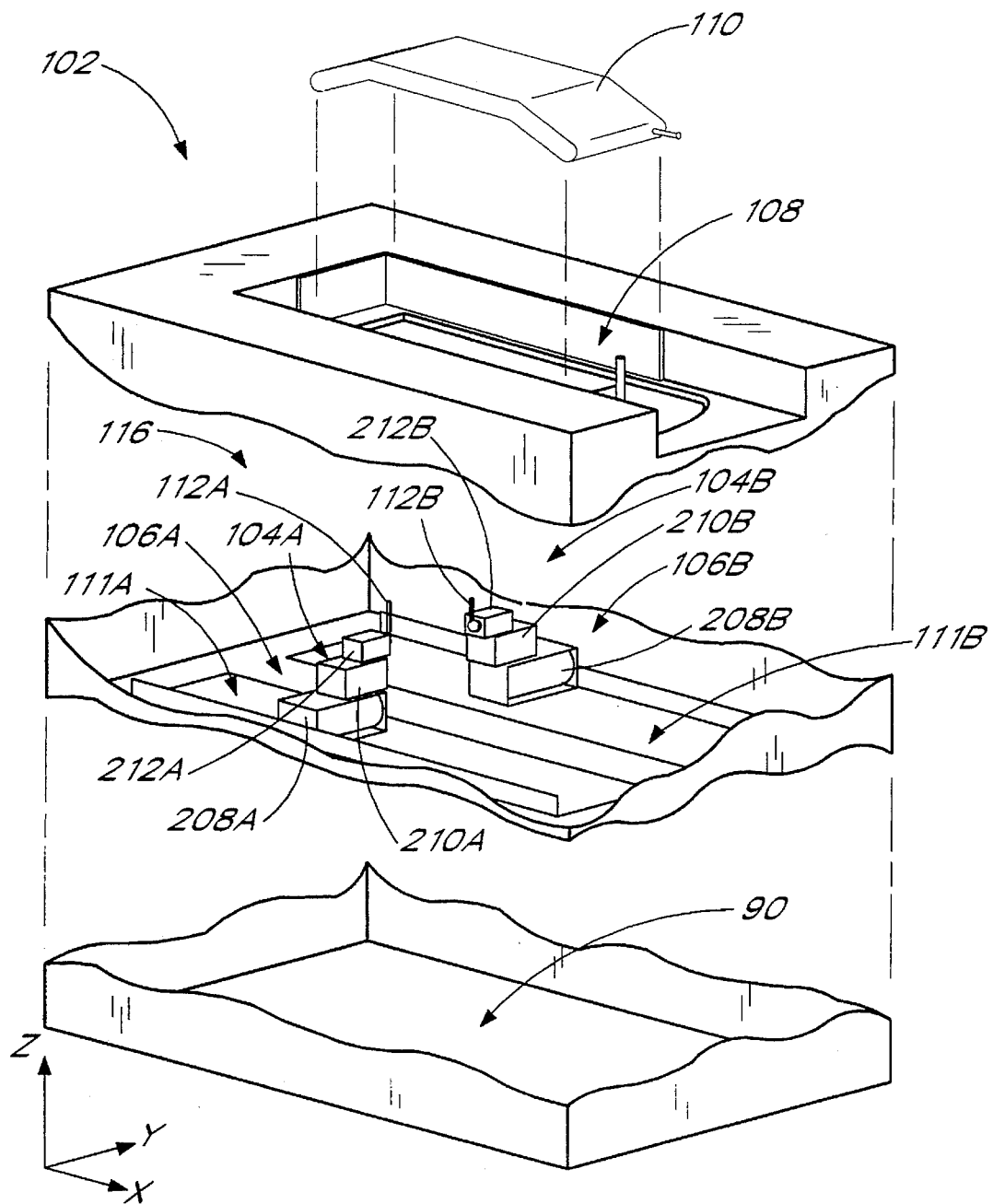
FIG. 2 illustrates, in a cut-away exploded view, the preferred embodiment of the cellular telephone programmer of the present invention, along with a handset of a cellular telephone.

The programmer 102 additionally comprises an electronic module 90 and an actuation assembly 116, as shown in FIG. 2. The electronic module 90 includes a programming module 114 (FIG. 3), while the actuation assembly 116 comprises a first actuation mechanism 111A and a second actuation mechanism 111B. The first actuation mechanism 111A comprises a first driver 106A and a first pusher member 112A. The second actuation mechanism 111B comprises a second driver 106B and a second pusher member 112B.

As illustrated in FIG. 2, a three-dimensional Cartesian coordinate system will be utilized in which the X-axis corresponds to the horizontal direction along the length of the programmer 102, the Y-axis corresponds to the horizontal direction along the width of the programmer 102, and the Z-axis corresponds to the vertical direction. The driver 106A comprises an X-axis motor controller 103A (FIG. 4), a Y-axis motor controller 105A (FIG. 4), and a Z-axis motor controller 107A (FIG. 4) housed in the electronic module 90. The driver 106A also comprises a motor assembly 104A, which comprises an X-axis motor 208A, a Y-axis motor 210A and a Z-axis motor 212A. The driver 106B comprises an X-axis motor controller 103B (FIG. 4), a Y-axis motor controller 105B (FIG. 4), and a Z-axis motor controller 107B (FIG. 4) housed in the electronic module 90. The driver 106B also comprises a motor assembly 104B, which comprises an X-axis motor 208B, a Y-axis motor 210B and a Z-axis motor 212B.

Figure 3:
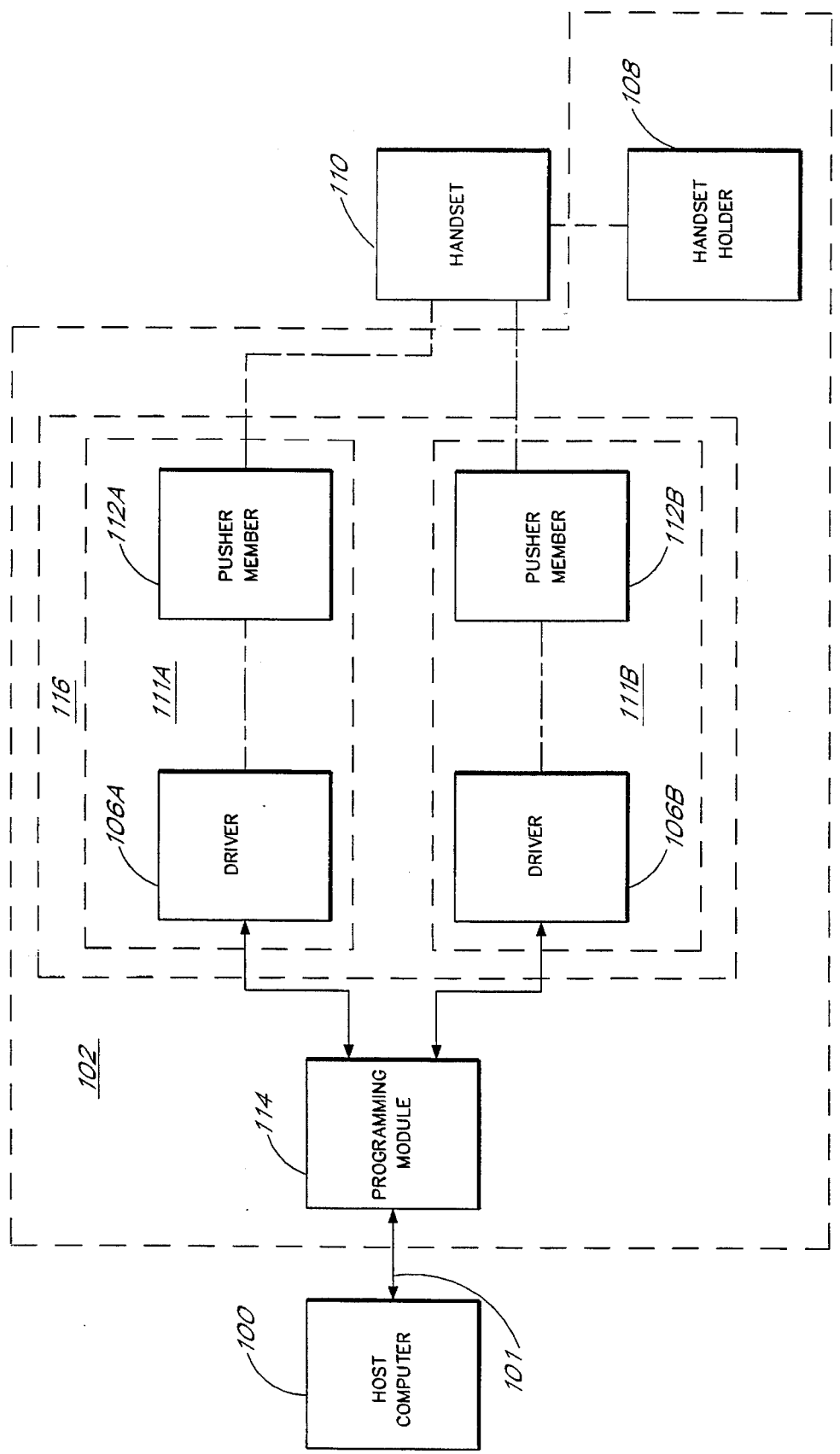
FIG. 3 is a functional block diagram of the cellular telephone programmer, the host computer and the handset of FIG. 1.
Figure 4:
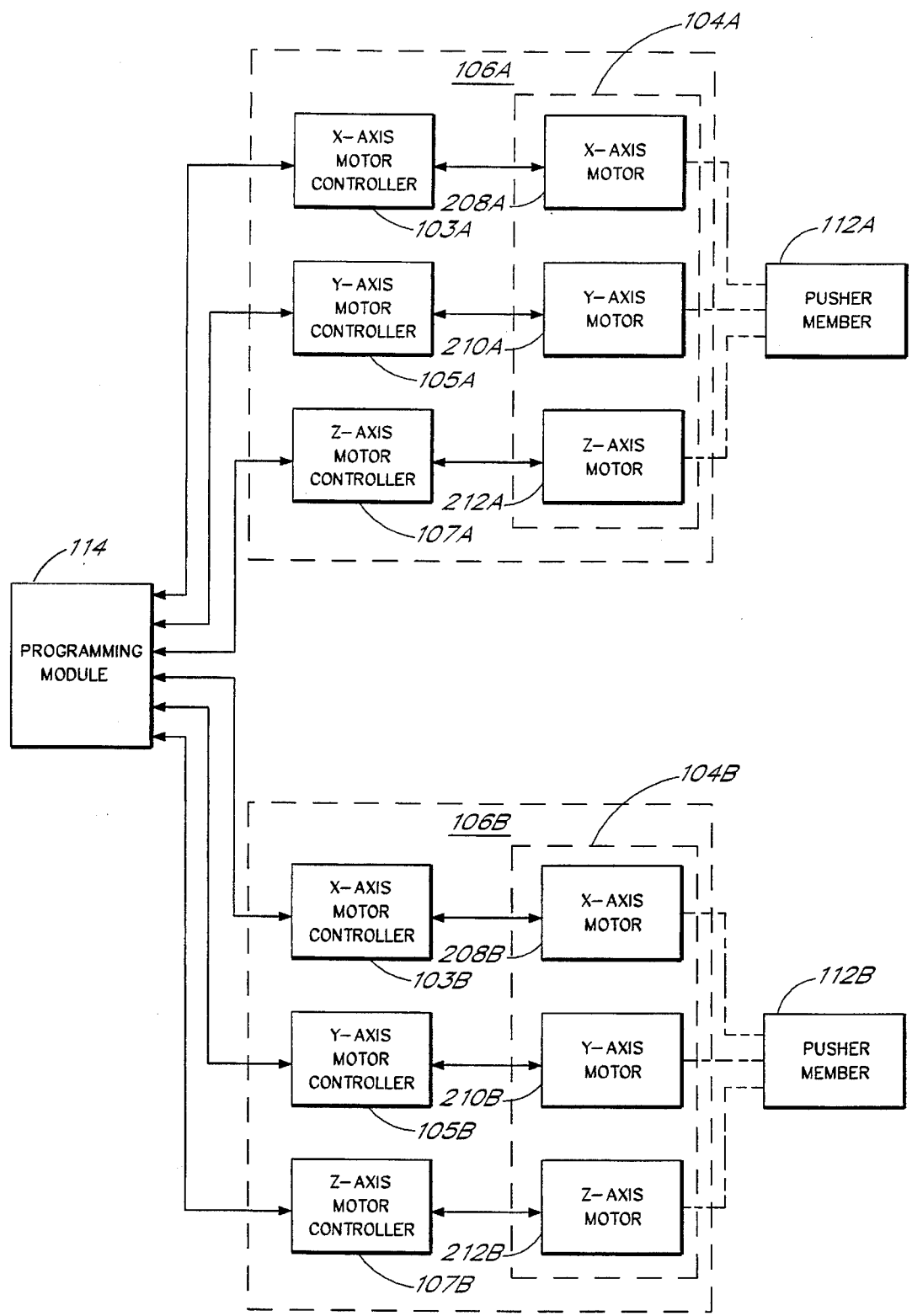
FIG. 4 is a functional block diagram of a programming module, a pair of drivers and a pair of pusher members of the preferred embodiment of the present invention.

Referring to FIGS. 3 and 4, the host computer 100 provides user-specific programming information to the programming module 114 over the line 101. The programming module 114 processes this user-specific programming information, as well as some model-specific programming information retained within the programming module 114, to provide instructions to the drivers 106A, 106B. The programming module 114 may comprise any of a number of programmable computers. In the preferred embodiment, the programming module 114 will comprise an 80×86-type CPU motherboard running a disk operating system (DOS). The programming module 114 will also preferably comprise a standard 150-watt PC power supply, a standard hard disk drive with at least 20 megabytes of available memory and an optional monitor and keyboard. If the programming module 114 comprises the optional monitor and keyboard, then the host computer 100 is not needed, and the programmer 102 can be operated as a stand-alone unit. Under these circumstances, the programming module 114 will perform the functions of the host computer 100.

The X-axis motor controller 103A responds to the instructions from the programming module 114 to control the X-axis motor 208A to move the pusher member 112A along the X-axis. The Y-axis motor controller 105A responds to the instructions to control the Y-axis motor 210A to move the pusher member 112A along an arc within the X-Y plane to effectively provide movement along the Y-axis. The Z-axis motor controller 107A responds to the instructions to control the Z-axis motor 212A to move the pusher member 112A along the Z-axis. The X-axis motor controller 103A, the X-axis motor 208A, the Y-axis motor controller 105A, the Y-axis motor 210A, the Z-axis motor controller 107A and the Z-axis motor 212A combine to move the pusher member 112A to any location within a three-dimensional space. Similarly, the X-axis motor controller 103B responds to the instructions from the programming module 114 to control the X-axis motor 208B to move the pusher member 112B along the X-axis. The Y-axis motor controller 105B responds to the instructions to control the Y-axis motor 210B to move the pusher member 112B along an arc within the X-Y plane to effectively provide movement along the Y-axis. The Z-axis motor controller 107B responds to the instructions to control the Z-axis motor 212B to move the pusher member 112B along the Z-axis. The X-axis motor controller 103B, the X-axis motor 208B, the Y-axis motor controller 105B, the Y-axis motor 210B, the Z-axis motor controller 107B and the Z-axis motor 212B combine to move the pusher member 112B to any location within a three-dimensional space. Although, in the preferred embodiment, the programming module 114 and the motor controllers 103A, 103B, 105A, 105B, 107A, 107B are located in the electronic module 90 (FIG. 2), beneath the motor assemblies 104A, 104B and the pusher members 112A, 112B, these units can also be placed at other locations within the programmer housing.

Figure 5:
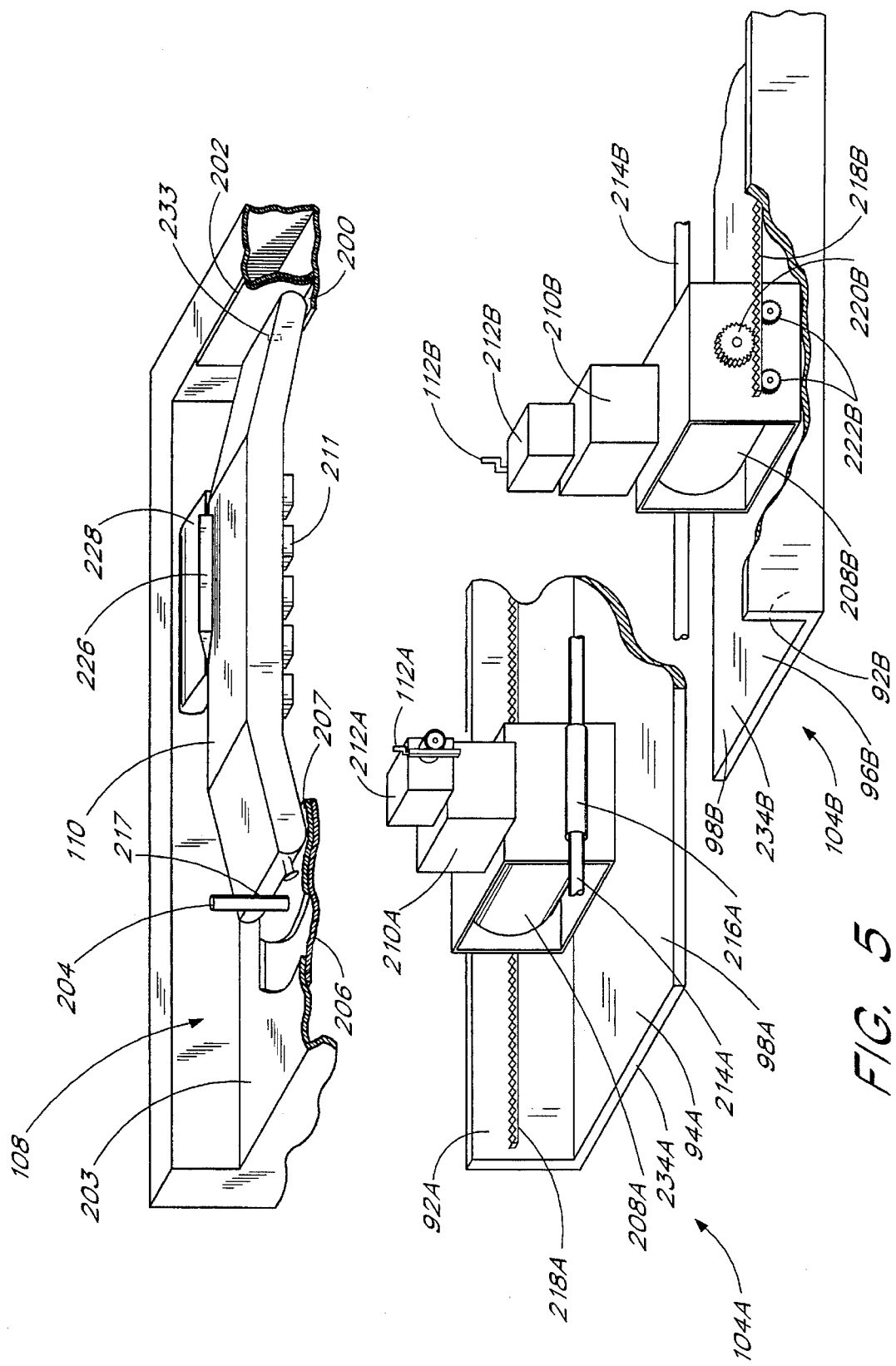
FIG. 5 illustrates a holder, a pair of pusher members and a corresponding pair of motor assemblies of the preferred embodiment of the present invention, with the holder securing a cellular telephone handset above the pusher members and the motor assemblies.

Referring to FIG. 5, the holder 108 secures the handset 110 of the cellular telephone so that a keypad on the handset 110 is accessible to the pusher members 112A, 112B below. The motor assembly 104A moves the pusher member 112A within a two dimensional range in the X-Y plane beneath a keypad 211 of the handset 110 to align the pusher member 112A directly beneath selected keys on the keypad 211. The motor assembly 104A also moves the pusher member 112A in the third dimension along the Z-axis so as to contact and depress such selected keys on the keypad 211. Similarly, the motor assembly 104B moves the pusher member 112B within the X-Y plane beneath the keypad 211 of the handset 110 to align the pusher member 112B directly beneath different keys on the keypad 211. The motor assembly 104B also moves the pusher member 112B in the third dimension along the Z-axis so as to contact and depress the selected keys on the keypad 211. Through use of the pair of pusher members 112A, 112B and the pair of motor assemblies 104A, 104B, the programmer 102 is capable of actuating any two keys on the keypad 211 simultaneously, as required for programming certain cellular telephones. Any of a variety of motors can be used for the X-axis motors 208A, 208B, the Y-axis motors 210A, 210B, and the Z-axis motors 212A, 212B. Preferably, each of these motors 208A, 208B, 210A, 210B, 212A, 212B will comprise a four-phase stepper motor having at least 200 steps per unit, although a stepper motor having as low as 12 steps per unit can also be used. Each of these motors 208A, 208B, 210A, 210B, 212A, 212B will preferably produce a torque of at least 12 oz-in. Generally, for such a motor 208A, 208B, 210A, 210B, 212A, 212B, the motor controllers 103A, 103B, 105A, 105B, 107A, 107B, represented in FIG. 4, preferably comprise a model number SA703 stepper controller from Strada Autotech, Inc., Elgin, Ontario, Canada. However, there are numerous other commercially available motor controller cards or circuits that can be used for the motor controllers 103A, 103B, 105A, 105B, 107A, 107B.

Figure 6:
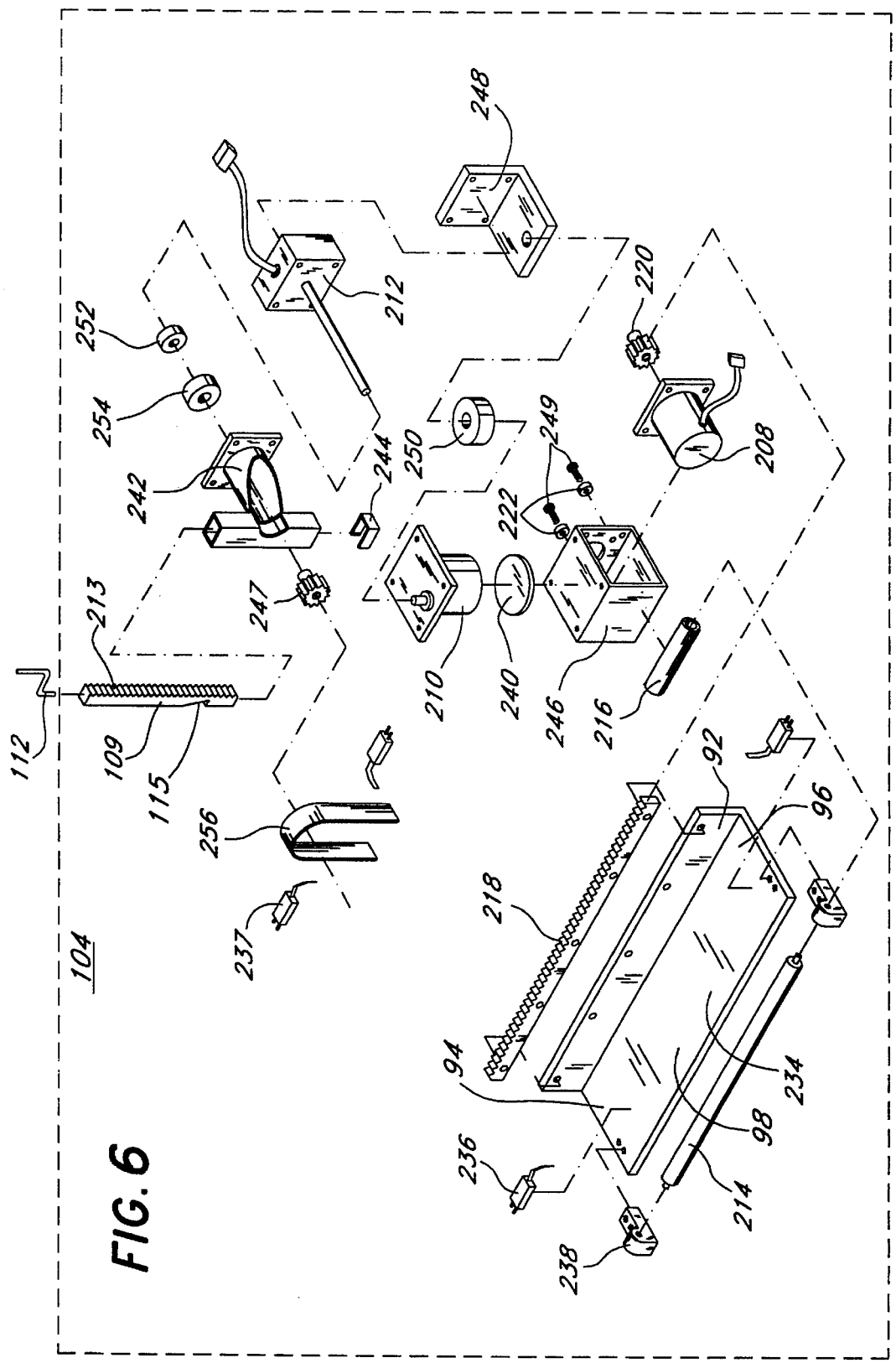
FIG. 6 is an exploded view of a motor assembly and a pusher member of the preferred embodiment of the cellular telephone programmer of the present invention.
Figure 7:
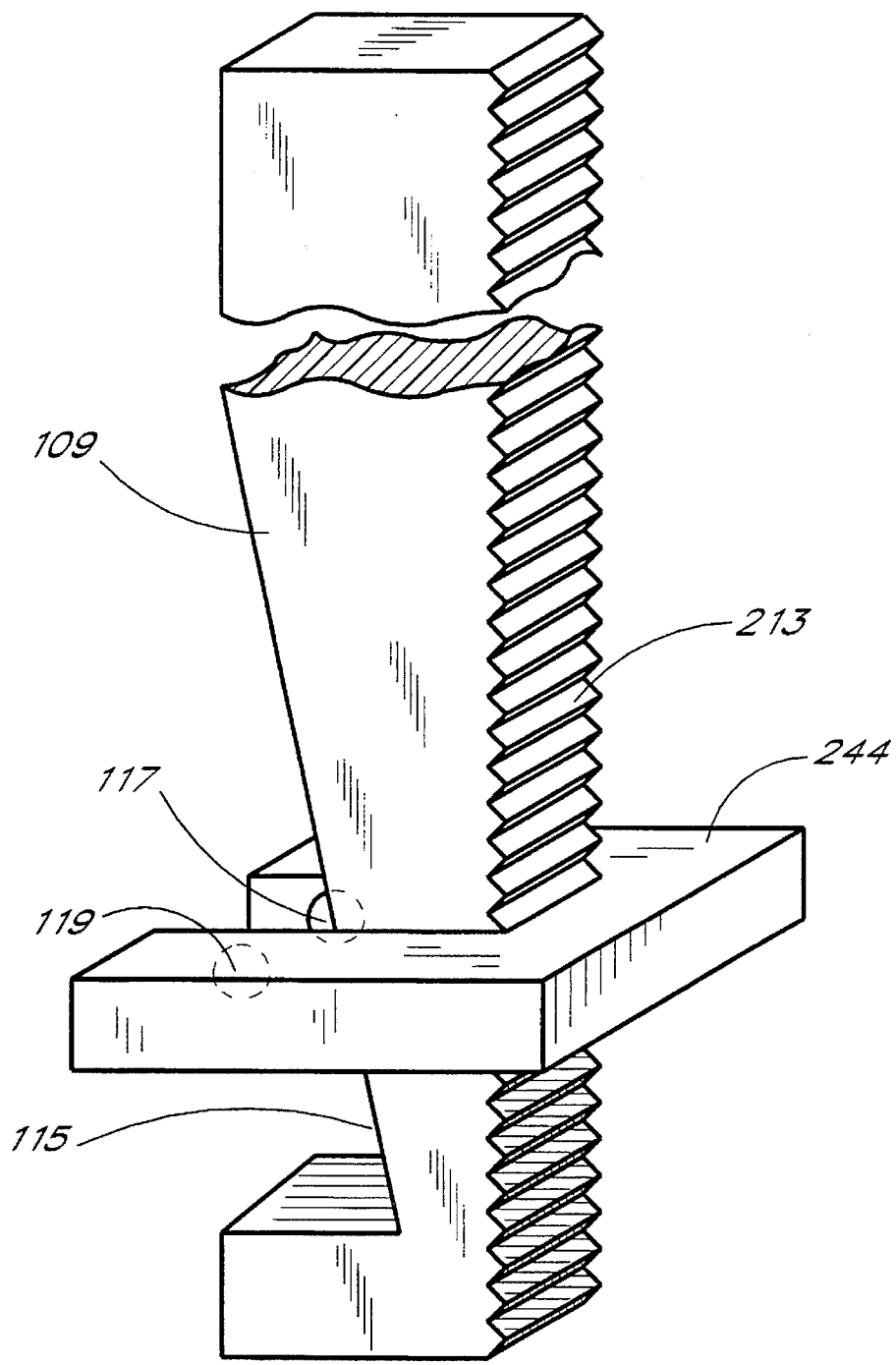
FIG. 7 illustrates a Z-axis rack and a Z-axis limit switch of the motor assembly of FIG. 6.

FIG. 6 illustrates an exploded view of a motor assembly 104 and a pusher member 112. The motor assembly 104 represents either of the motor assemblies 104A, 104B of the preferred embodiment, while the pusher member 112 represents either of the pusher members 112A, 112B of the preferred embodiment. The motor assembly 104 comprises a base 234, a guide rod 214, a pair of guide brackets 238, a pair of X-axis limit switches 236, a rack 218, a guide rod bushing 216, an X-axis motor housing 246, an X-axis motor 208 having a drive shaft extending therefrom, a spur gear 220, a pair of guide bearings 222, a pair of fasteners 249, a damper pad 240, a Y-axis motor 210 having a drive shaft extending therefrom, a motion damper 250, a Z-axis motor housing 248, a Z-axis motor 212 having a drive shaft extending therefrom, a bearing 252, a bearing housing 254, a Z-axis rack housing 242, a spur gear 247, a Z-axis rack 109, a Z-axis position sensor 244, a pair of Y-axis limit switches 237, and a Y-axis limit switch trigger 256. The base 234 comprises a rack mounting surface 92, a guide rod mounting edge 98, a right end 94 and a left end 96. The Z-axis rack 109 comprises a rack edge 213 and a Z-axis position indicator notch or tapered notch 115. As shown in FIG. 7, the Z-axis position sensor 244 comprises a light source 117, such as a light emitting diode, and a light sensor 119.

Referring to FIGS. 6 and 7, the base 234 is mounted to the structure of the programmer 102, generally parallel to the X-axis. The guide rod 214 is attached to the base 234 by the pair of guide brackets 238, also generally parallel to the X-axis. The limit switches 236 are attached to opposite ends of the base 234. The rack 218 is attached to the base 234 relatively distant from the guide rod 214 and generally parallel to the X-axis. The guide rod bushing 216 surrounds the circumference of the guide rod 214. The X-axis motor housing 246 is attached to the guide rod bushing 216. The X-axis motor 208 is mounted inside the X-axis motor housing 246, with the shaft protruding horizontally in a direction that is parallel to the Y-axis. The spur gear 220 is mounted on the shaft of the X-axis motor 208 and couples with the rack 218 to form a rack and pinion device. The pair of guide bearings 222 are attached to a shaft side of the X-axis motor housing 246 by the pair of fasteners 249.

The damper pad 240 is mounted on a top side of the X-axis motor housing 246. The Y-axis motor 210 is mounted on a top side of the damper pad 240, with the shaft protruding upward, in a direction that is generally parallel to the Z-axis. The motion damper 250 is placed around the shaft of the Y-axis motor 210. The Z-axis motor housing 248 is secured to the shaft of the Y-axis motor 210, on top of the motion damper 250. The Z-axis motor 212 is attached to the Z-axis motor housing 248, with the shaft protruding horizontally. The bearing 252 and the bearing housing 254 are mounted on the shaft of the Z-axis motor 212. The Z-axis rack housing 242 is mounted to the Z-axis motor 212 so that a cylindrical portion of the Z-axis rack housing 242 surrounds the shaft of the Z-axis motor 212. The spur gear 247 is mounted on the shaft of the Z-axis motor 212. The Z-axis rack 109 is mounted inside the Z-axis rack housing 242 so that the rack edge 213 couples with the spur gear 247 forming a second rack and pinion device. The Z-axis position sensor 244 is attached to the bottom of the Z-axis rack housing 242, so that light from the light source 117 will reach the light sensor 119 through the tapered notch 115, depending on the Z-axis position of the Z-axis rack 109. The Y-axis limit switches 237 are attached to the Y-axis motor 210. The Y-axis limit switch trigger 256 is mounted on the Z-axis rack housing 242. The pusher member 112 is attached to an upper end of the Z-axis rack 109. The pusher member 112 may be formed integrally with the Z-axis rack 109.

The guide rod bushing 216 surrounds and rides on the guide rod 214. The guide rod bushing 216 is also attached to the X-axis motor housing 246. The rack 218 is pressed between the guide bearings 222 and the spur gear 220 so that the spur gear 220 mates with the rack 218. The spur gear 220 is mounted on the shaft of the X-axis motor 208, while the guide bearings are attached to the X-axis motor housing 246. Thus, the X-axis motor housing 246 and the X-axis motor 208 are supported above the base 234 between the guide rod 214 and the rack 218 by the guide rod bushing 216 riding on the guide rod 214 and the spur gear 220 riding on the rack 218.

Each of the motors 208, 210 and 212 can be activated to drive its respective shaft in either a clockwise or a counterclockwise direction. When the X-axis motor 208 is activated, the spur gear 220 is driven against the rack 218 to drive the X-axis motor housing 246, and all elements connected thereto, in a direction parallel to the rack 218, which is generally parallel to the X-axis. As the X-axis motor housing 246 travels in the X direction, the guide rod bushing 216 slides along the guide rod 214. A maximum displacement is selected in each direction along the X-axis that will allow sufficient movement of the pusher member 112 to program the desired telephones. The X-axis limit switches 236 are positioned so that the X-axis motor housing 246 will contact one or the other of the limit switches 236 when the X-axis motor housing 246 has traveled to its maximum displacement in either direction. When the X-axis motor housing 246 makes contact with a limit switch 236, the limit switch 236 generates a signal indicating that the X-axis motor housing 246 has reached its maximum displacement. This signal is transmitted to an X-axis motor controller 103A, 103B.

When an electrical stimulus is applied to the Y-axis motor 210, the shaft of the Y-axis motor 210 rotates, causing the Z-axis motor housing 248 to also rotate. The damper pad 240 between the Y-axis motor 210 and the X-axis motor housing 246 reduces the amount of noise generated by the vibration of the Y-axis motor 210 and the X-axis motor 208. The rotation of the Z-axis motor housing 248 causes the elements connected thereto to rotate. Specifically, this causes the pusher member 112 to rotate about an arc centered at the shaft of the Y-axis motor 210. This rotational motion provides the pusher member 112 with a second degree of motion. By combining the motion produced by the X-axis motor 208 and the Y-axis motor 210, the pusher member 112 can be moved to any point within a two-dimensional range in the X-Y plane.

The Y-axis limit trigger 256 is mounted to the Z-axis rack housing 242, and rotates upon activation of the Y-axis motor 210. In contrast, the Y-axis limit switches 237 are connected to the Y-axis motor 210, so that they will not rotate upon activation of the Y-axis motor 210. The Y-axis limit switches 237 are positioned so that they will be closed by the Y-axis limit switch trigger 256 when the Y-axis motor 210 has displaced the pusher member 112 to either of two maximum angles of rotation. The Y-axis limit switches 237 generate a signal upon closure that is transmitted to a Y-axis motor controller 105A, 105B. The motion damper 250 between the Y-axis motor 210 and the Z-axis motor housing 248 provides additional drag on the Y-axis motor 210 so that the shaft of the Y-axis motor 210 will not rotate back after a one-half step movement.

When an electrical stimulus is applied to the Z-axis motor 212, the shaft drives the spur gear 247. The bearing 252 and the housing 254 provide support for the shaft of the Z-axis motor 212. The spur gear 247 couples with the rack edge 213 on the Z-axis rack 109 to drive the pusher member 112 in a positive or negative vertical direction. The Z-axis position sensor 244 is attached to a bottom surface of the Z-axis rack housing 242; and the Z-axis position sensor 244 will detect a maximum or a minimum height for the Z-axis rack 109, thus functioning as a limit switch, in addition to determining the vertical position of the Z-axis rack 109.

The Z-axis position sensor 244 of the preferred embodiment is shown in greater detail in FIG. 7. The position sensor 244 comprises a generally U-shaped device with a light source 117, such as a light emitting diode, directed toward a light sensor 119. The light source 117 and the light sensor 119 will be mounted at opposite ends of the U-shaped device. Also, the Z-axis rack 109 has a tapered notch 115 opposite the rack edge 213. When the rack 109 is positioned so that the light source 117 is at one end (e.g., the top end) of the notch 115, substantially all of the light from the source 117 will be blocked by the rack 109, and substantially no light will reach the sensor 119. When the rack 109 is positioned so that the light source 117 is at the other end (e.g., bottom end) of the notch 115, substantially all of the light from the source 117 will pass through the notch 115 and propagate to the sensor 119. Between these two extreme positions, the portion of the rack 109 adjacent the tapered notch 115 will block a portion of the light and thus, only a portion will pass through the notch and reach the sensor 119. The amount of this portion that reaches the sensor will depend on the position of the Z-axis rack 109 on the Z-axis, and thus, the position of the pusher member 112 can be determined by measuring the light that travels from the light source 117 to the light sensor 119. The light sensor 119 generates an electrical voltage representing the quantity of light that it receives. This voltage is transmitted to a Z-axis motor controller 107A, 107B, which determines the position of the pusher member 112, based on the amount of light reaching the light sensor 119. The tapered notch 115 of the pusher member 112 may be replaced by a pattern of holes that will vary the transmission of light depending on the position of the Z-axis rack 109. As another alternative, the light sensor 119 can be mounted on the Z-axis motor controller 107A, 107B. Then, the light that passes through the tapered notch 115 can be conveyed from the position sensor 244 to the light sensor 119 on the Z-axis motor controller 107A, 107B via a fiber optic cable. The X-axis limit switches 236 and the Y-axis limit switches 237 may comprise mechanical micro switches with an extended arm or they may comprise optical switches.

Referring again to FIG. 5, a base 234A and a base 234B are mounted on a common surface of the structure of the programmer 102. The bases 234A, 234B are mounted generally parallel to the X-axis, and they are slightly displaced from one another in both the X direction and the Y direction. The base 234A is positioned so that a rack mounting surface 92A of the base 234A is closer to the outside of the programmer 102, while a guide rod mounting edge 98A of the base 234A is closer to the center of the programmer 102. Similarly, the base 234B is positioned so that a rack mounting surface 92B of the base 234B is closer to the outside of the programmer 102, while a guide rod mounting edge 98B of the base 234B is closer to the center of the programmer 102. Although the motor assemblies 104A, 104B are preferably identical to one another, their orientation within the programmer 102 causes a difference between the electrical signals required to obtain the same relative X movements and Y movements. Applying an electrical signal to the motor 208B that would cause a clockwise rotation of the gear 220B, from the perspective of FIG. 5, would cause the pusher member 112B to move away from the securing post 204, while applying the same electrical signal to the motor 208A would cause the pusher member 112A to move toward the securing post 204. Also, with the pusher member 112B positioned as illustrated in FIG. 5, applying an electrical signal to the motor 210B that would cause a clockwise rotation of the pusher member 112B, as viewed from the top, would cause the pusher member 112B to move away from the securing post 204. Similarly, with the pusher member 112A positioned as illustrated in FIG. 5, applying the same electrical signal would cause the pusher member 112A to move toward the securing post 204.

The orientation of the motor assembly 104A, 104B also affects the position of the pusher member 112A, 112B relative to the Z-axis rack housing 242A, 242B and the keypad 211. As shown in FIG. 6, the pusher member 112 is mounted toward the right side of the rack housing 242, as viewed from the motor 212. This same relative positioning applies to both pusher members 112A, 112B. However, with the pusher members 112A, 112B positioned as shown in FIG. 5, the pusher member 112A is on the side of the rack housing 242A that is closer to the securing post 204, while the pusher member 112B is on the side of the rack housing 242B that is further from the securing post 204. This orientation of the pusher members 112A, 112B relative to the rack housings 242A, 242B enables the pusher members 112A, 112B to be moved closer to one another and it allows the pusher members 112A, 112B to actuate two keys in the same column of keys (i.e., keys having approximately the same Y-axis coordinate) on the keypad 211 simultaneously, without the rack housings 242A, 242B or the motor assemblies 104A, 104B interfering with one another.

Preferably, the pusher member 112A, 112B can be moved to within approximately ¼" of one another and either pusher member 112A, 112B can activate any key on the keypad 211 of any cellular telephone on the market. The pusher members 112A, 112B of the preferred embodiment of the present invention have a range of motion of approximately 14" in the X-direction, a 3" radius of rotary motion in the Y-direction, and a 3" range of motion in the Z-direction. Also, the tolerance of the positioning of the pusher members 112A, 112B is preferably approximately ±¹⁄₃₂" in the X and Y directions and approximately +¹⁄₆₄" in the Z direction. However, in the X and Y directions, a tolerance of approximately ±¹⁄₁₆" is acceptable. The tolerance required for the positioning of the pusher members 112A, 112B depends on the variation in keypad configurations for the various models of cellular telephones to be programmed. The various keypad configurations can vary as to the number and arrangement of keys, the distances between keys, the size of the keys, the required depth of depression, the angle of the keypad relative to other surfaces of the handset and the curvature of the keypad, as well as numerous other aspects.

Figure 8:
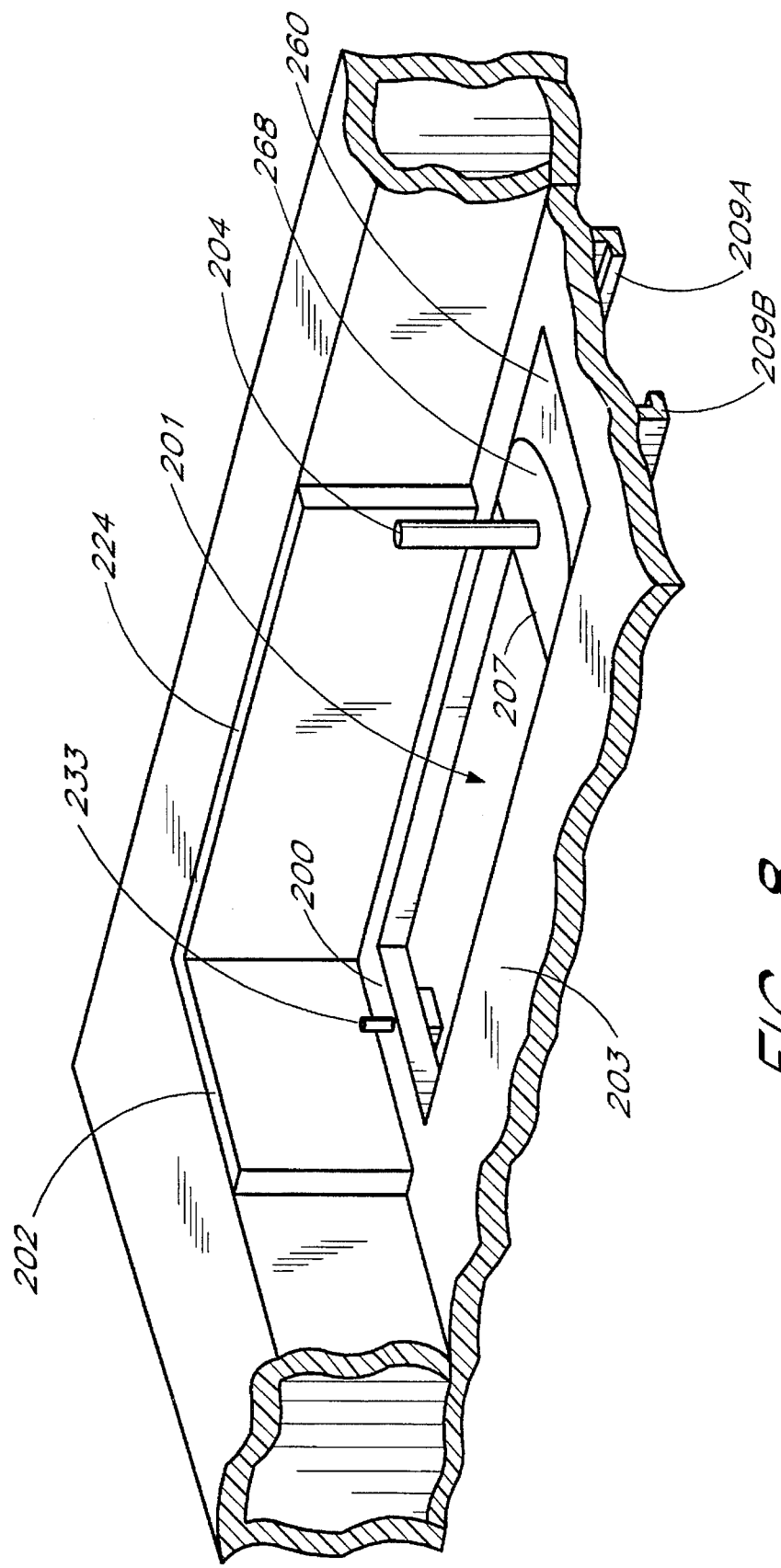
FIGS. 8 and 9 further illustrate aspects of the holder of FIG. 5, without the handset of a cellular telephone.
Figure 9:
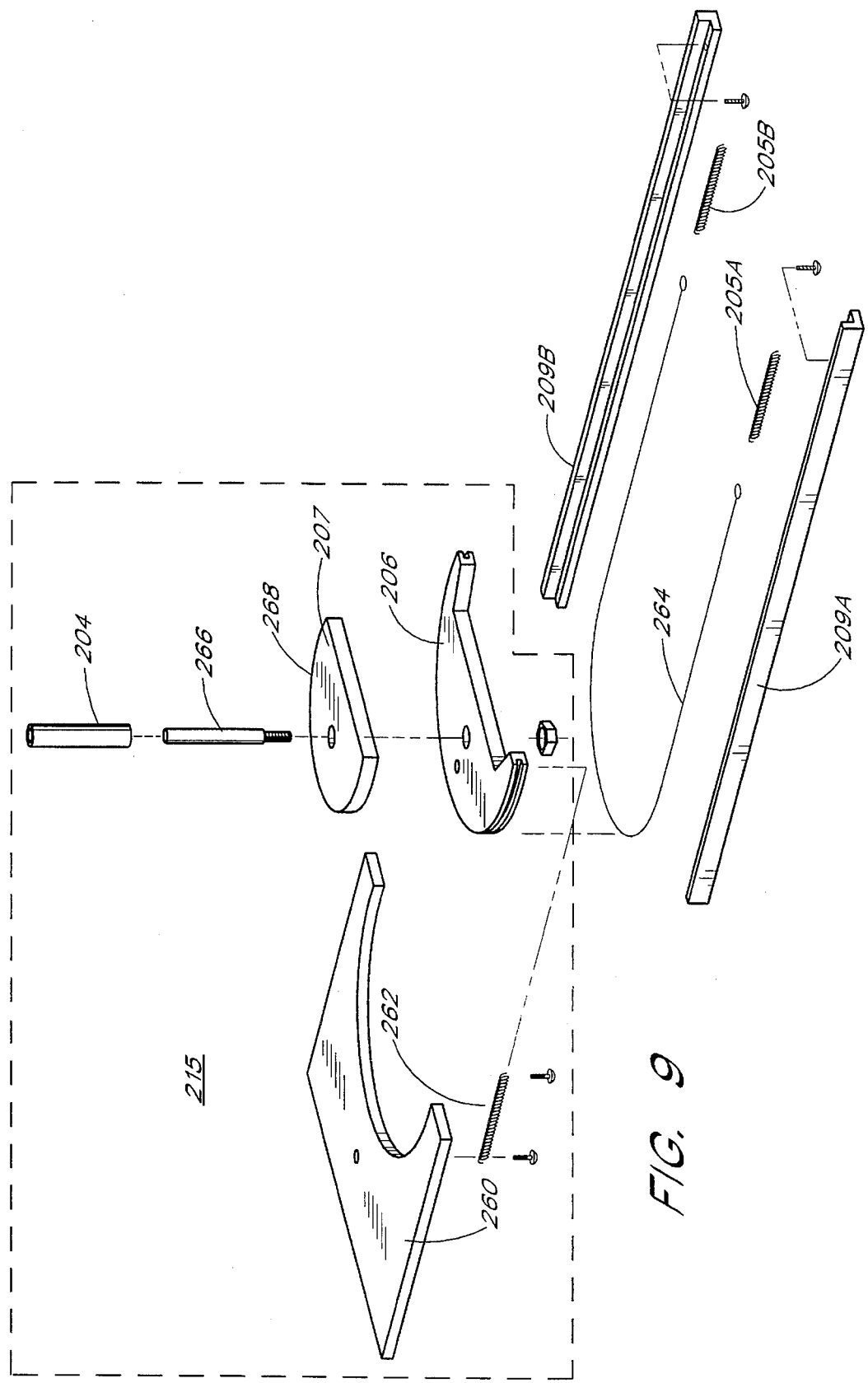
Figure 10:
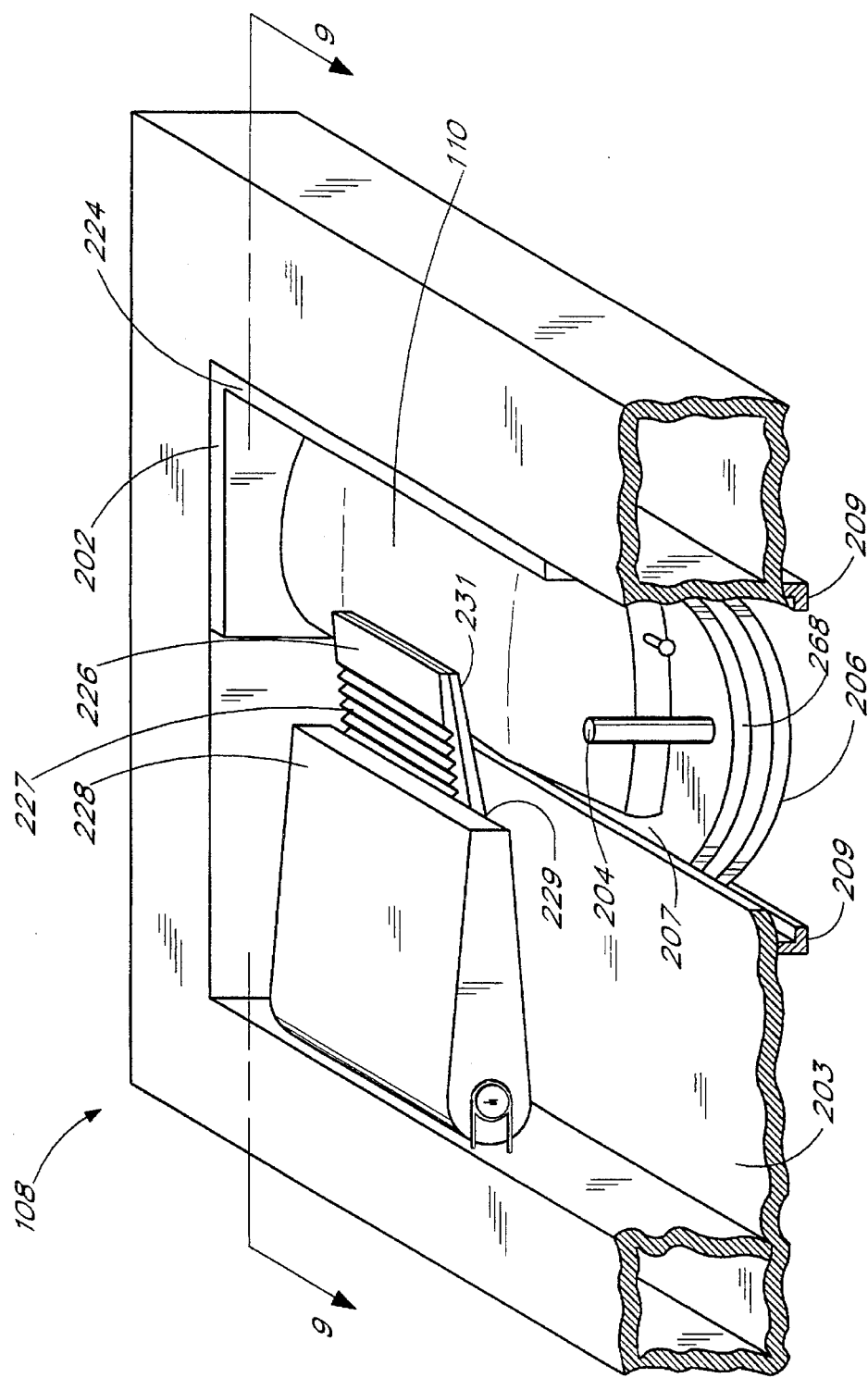
FIG. 10 further illustrates aspects of the holder of FIG. 5, as the holder secures the handset of a cellular telephone.
Figure 11:
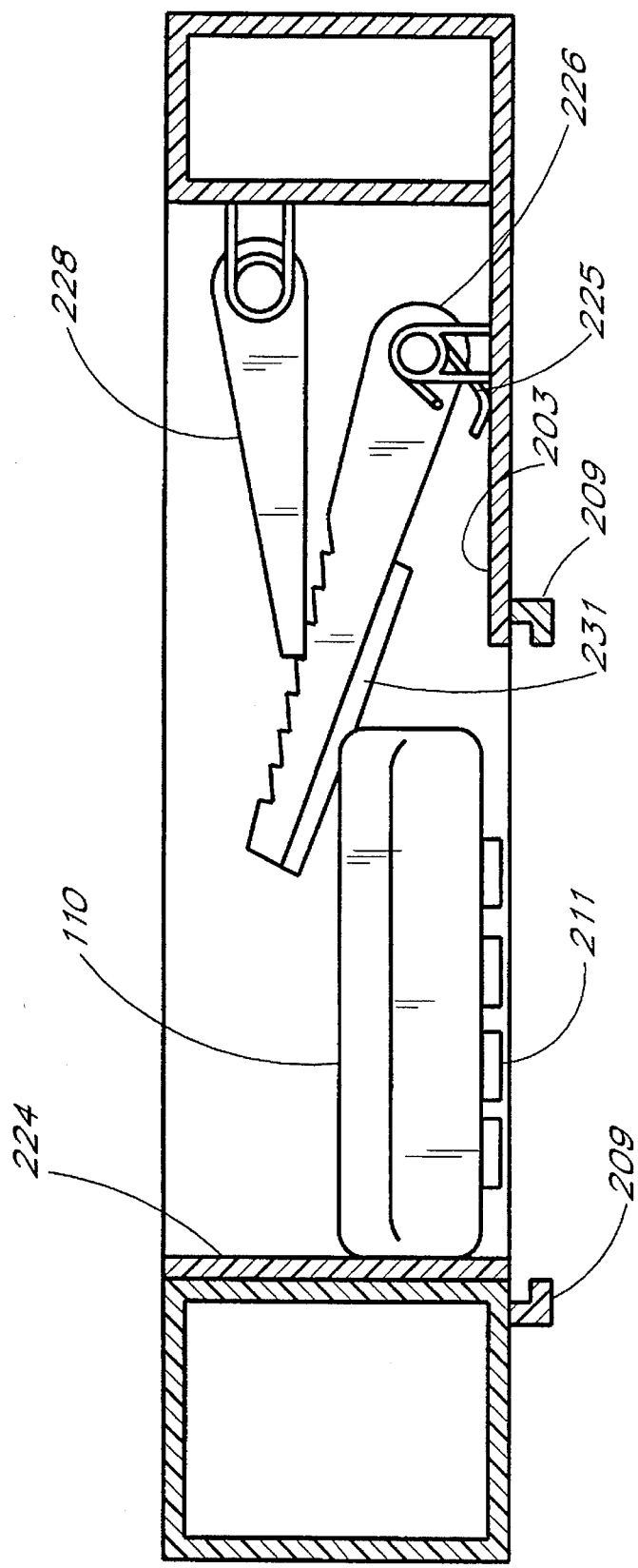
FIG. 11 is a cross-sectional view of the holder and the cellular telephone handset of FIG. 10.

FIGS. 5, 8, 9, 10 and 11 illustrate various aspects of the holder 108 of the preferred embodiment. FIG. 8 illustrates an open programming area 201, defined by a holder mounting surface 203, through which the pusher members 112A, 112B can extend to access the keypad 211 of a handset 110 of a cellular telephone. The holder 108 additionally comprises an X-axis supporting surface 202, a Y-axis supporting surface 224, a Z-axis supporting lip 200 of the holder mounting surface 203, and a handset verification switch 233. Referring to FIG. 9, the holder 108 additionally comprises a pivot slide assembly 215, a pair of grooves 209A, 209B, a wire 264, and a pair of tension springs 205A, 205B. The pivot slide assembly 215 comprises a tension spring 262, an end slide 260, a securing post 204, a securing post base 266, a pivot plate 268 with a Z-axis supporting lip 207, and a pivot slide 206. Referring to FIGS. 10 and 11, the holder 108 additionally comprises a ratcheted securing arm 226 having locking grooves 227 and a padded securing surface 231, a locking arm 228 having a locking edge 229, and a spring 225.

As shown in FIG. 8, the X-axis supporting surface 202 and the Y-axis supporting surface 224 are attached to external surfaces of the programmer 102. The handset verification switch 233 is mounted through the Z-axis supporting surface 200 so that the activation button of the switch 233 extends above the supporting surface 200. The pair of grooves 209A, 209B are attached to the underside of the holder mounting surface 203, on either side of the programming area 201, generally parallel to the X-axis.

As illustrated in FIG. 9, a first end of the tension spring 205A is attached at one end of the groove 209A, while a first end of the tension spring 205B is attached at one end of the groove 209B. One end of the wire 264 is attached to a second end of the spring 205A, while a second end of the wire 264 is attached to a second end of the spring 205B. The wire 264 forms a U-shape between the springs 205A, 205B. The pivot slide 206 fits inside the bottom of the U-shape formed by the wire 264, with an open end of the pivot slide 206 facing generally toward the springs 205A, 205B, and generally parallel to the Y-axis. The pivot slide 206 fits within the grooves 209A, 209B and slides in a direction generally parallel to the X-axis. The wire 264 is preferably glued to the pivot slide 206 at a point that is generally furthest from the springs 205A, 205B. The pivot plate 268 is placed on top of the pivot slide 206, with the supporting lip 207 generally parallel with the Y-axis and near the open end of the pivot slide 206. The securing post base 266 is attached through the pivot plate 268 to the pivot slide 206. The securing post 204 is mounted over the securing post base 266. The end slide 260 is placed within the grooves 209A, 209B and slides generally along the X-axis. A first end of the tension spring 262 is attached to the end slide 260, while a second end of the tension spring 262 is attached to the pivot slide 206.

As shown in FIGS. 10 and 11, the ratcheted securing arm 226 is attached to the holder mounting surface 203 so that the securing arm 226 can rotate toward or away from the programming area 201, within the Y-Z plane. The securing arm 226 is mounted so that the securing surface 231 faces toward the programming area 201 and the locking grooves 227 face away from the programming area 201. The locking arm 228 is attached to an external surface of the programmer 102 so that the locking arm 228 can also rotate toward or away from the programming area 201, within the Y-Z plane. The locking arm 228 is mounted so that the locking edge faces the securing arm 226. The spring 225 is positioned to apply a force against the securing arm 226 tending to cause the securing arm 226 to rotate away from the programming area 201.

Referring generally to FIGS. 5, 8, 9, 10 and 11, when there is no handset 110 within the holder 108, the springs 205A, 205B will pull the pivot slide assembly 215, which slides within the grooves 209A, 209B, toward the switch 233 by means of the wire 264. To place a handset 110 within the holder 108, an operator will press a first end of the handset 110 against the securing post 204 and push the pivot slide assembly 215 away from the switch 233. The end of the handset 110 that will be pressed against the securing post 204 will typically be the end that is nearest to the speaker of the telephone handset 110. When the pivot slide assembly 215 has been pushed far enough away from the switch 233 so that an opposite end of the handset 110 clears the supporting surface 202, then the handset 110 can be lowered until it makes contact with the supporting surfaces 200 and 207. The operator will position the handset 110 so that one surface of the handset 110 contacts the supporting surface 224. As the handset 110 is lowered toward the supporting surface 200, the handset 110 will activate the switch 233. The springs 205A, 205B maintain a force against the pivot slide assembly 215, pulling the securing post 204 against the end of the handset 110. This force presses the opposite end of the handset 110 against the supporting surface 202, restraining the handset 110 in the X direction. A surface 217 of the securing post 204 contacts the end of the handset 110. This surface 217 constitutes a movable pressing surface, which secures or restrains the handset 110 against the supporting surface 202.

The sliding action of the pivot slide assembly 215 allows the holder 108 to adapt to different cellular telephone handsets 110 of different lengths. The shape of the pivot slide 206 allows the pivot slide 206 to rotate so that the supporting lip 207 of the pivot plate 268 is no longer parallel with the Y-axis. This allows the securing post 204 to move to one side or the other to account for an antennae, or other protrusion, located at the center of the end of the handset 110. The rotational aspect of the pivot slide assembly 215 is not necessary if there is no need to program any telephones that have such a protrusion. The spring 262 pulls the middle of the pivot slide 206 toward the center of the end slide 260 to bias the rotational position of the pivot slide assembly 215 so that the supporting lip 207 is generally parallel to the Y-axis. Thus, if there is no protrusion forcing the pivot slide 206 to rotate, the pivot slide 206 maintains the rotational position in which the supporting lip 207 is generally parallel to the Y-axis.

After the handset 110 has been placed between the securing post 204 and the supporting surface 202, the operator rotates the locking arm 228 toward the handset 110, pressing the securing arm 226 toward the handset 110 also. After the securing surface 231 of the securing arm 226 contacts the handset 110, the operator can release the locking arm 228. The spring 225 will press the securing arm 226 away from the handset 110 and toward the locking arm 228. The locking edge 229 of the locking arm 228 will lock inside one of the locking grooves 227 on the securing arm 226. The spring 225 will then hold the securing arm 226 against the locking arm 228 so that neither arm 226, 228 moves. The locking grooves 227 are spaced closely together and the securing surface 231 is compressible, so that when the locking arm 228 locks the securing arm 226 into place, the padded securing surface 231 maintains contact with the handset 110. The securing arm 226 presses the handset 110 against the supporting surface 224 to secure the handset 110 in the Y direction; and it presses the handset 110 against the supporting surfaces 200, 207 to secure the handset 110 in the Z direction. The rotational movement of the securing arm 226 and the locking arm 228 allow the holder 108 to secure a variety of handsets 110 with different heights, widths and lengths. The pivot slide assembly 215 and the securing arm 226 make the holder 108 adaptable in three dimensions to hold a variety of cellular telephone handsets.

As described above, the springs 205A, 205B pull the securing post 204 against the handset 110, which presses the handset 110 against the supporting surface 202. Also, the locking arm 228 presses the securing arm 226 against the handset 110, which presses the handset 110 against the supporting surfaces 224,200, 207. These forces ensure that each time a handset 110 is secured inside the holder 108, the handset 110 will be in substantially the same location and will have substantially the same orientation, as long as the handset 110 is inserted with the keypad 211 facing generally down toward the programming area 201 and with the speaker of the handset 110 nearer to the securing post 204. Specifically, the handset 110 will always be located against the supporting surfaces 200, 207, 202, 224; and it will always be generally parallel to the X-Y plane. This consistent placement and orientation of the handset 110 allows the programming module 114 to accurately calculate the position of each of the keys on the keypad 211, based on the dimensions of the handset 110 and the keypad 211 of the particular model of cellular telephone to be programmed.

Figure 12:
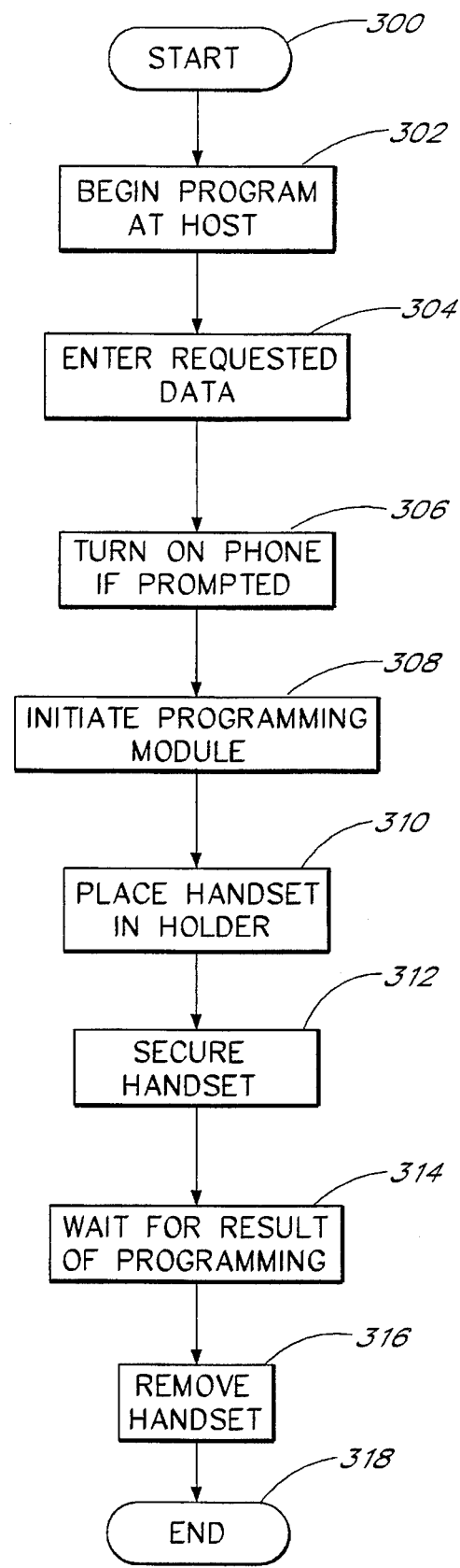
FIG. 12 is a flowchart illustrating a method of using the automated cellular telephone programmer of the present invention, along with a host computer, to program a cellular telephone.

FIG. 12 is a flowchart illustrating a method for using the automated key actuating cellular telephone programmer 102 of the present invention, along with a host computer 100, to program a cellular telephone. The method begins at a block 300. At a process block 302, an operator executes a computer program at the host computer 100. This program solicits responses from the operator related to user-specific information required for programming the cellular telephone. The information requested includes the model number of the telephone to be programmed, the telephone number to be used in operation and a number of options related to the operation of the cellular telephone. The program on the host computer 100 first solicits the model number for the telephone to be programmed. The program then uses the model number to determine what other user-specific information will be required by referring to a database located on a hard disk of the host computer 100. At a process block 304, the operator enters the requested information into the host computer 100. The program of the host computer 100 continues to solicit information from the operator until all of the required or desired user-specific information has been entered.

After receiving all of the user-specific programming information, the program in the host computer 100 determines whether the power button for the cellular telephone to be programmed is on the keypad 211 of the handset 110 by referring to the database stored on the hard disk in the host computer 100. If the power button for the cellular telephone is not located on the keypad 211, then the programmer 102 cannot activate the power button. Consequently, the host computer 100 prompts the operator to turn on the cellular telephone. At a process block 306, the operator turns on the cellular telephone, if prompted by the host computer 100.

At a process block 308, the host computer 100 sends a message to the programmer 102 over the serial interface 101 requesting that the programmer 102 program the telephone. This message also contains a 1000 character string containing the user-specific information needed to program the cellular telephone. Upon receiving this request, the programming module 114 waits for a signal from the switch 233 indicating that the handset 110 of the cellular telephone has been placed inside the holder 108 of the programmer 102.

After the process block 308, the program at the host computer 100 prompts the operator to secure the handset 110 inside the holder 108 of the programmer 102. At a process block 310, the operator places the handset 110 inside the holder 108, as described above with reference to FIGS. 5, 8, 9, 10 and 11.

At a process block 312, the operator secures the handset 110 in the holder 108 by rotating the locking arm 228 toward the handset 110, also as described above with reference to FIGS. 5, 8, 9, 10 and 11. The securing arm 226 and the locking arm 228 should be locked into place within approximately 5 seconds of the time that the switch 233 is activated by the insertion of the handset 110 into the holder 108. This ensures that the programmer 102 does not begin to actuate keys on the keypad 211 before the handset 110 is fully secured. The switch 233, upon activation, generates a signal to the programming module 114, indicating that the handset 110 has been inserted into the holder 108. The programmer 102 then attempts to program the cellular telephone. The general method by which the programmer 102 programs a cellular telephone will be described in greater detail below with reference to FIGS. 13A and 13B.

After the programmer 102 has attempted to program the cellular telephone, the programming module 114 returns a message to the host computer 100 over the serial interface 101 to indicate whether the attempted programming was successful. The host computer 100 receives this message and displays the result for the operator. At a process block 314, the operator waits to determine whether the programming was successful. A positive result indicates that the programmer 102 has verified the model number and the position of the handset 110, and that the programmer 102 has executed an entire programming routine without detecting any problems. The most significant problem that may be encountered during the programming routine is for a pusher member 112A, 112B to make contact with a surface at a location at which there should be no surface. The detection of such an error will be described in greater detail below, with reference to FIGS. 14A and 14B.

At a process block 316, the operator removes the handset 110 from the holder 108. This is typically accomplished by pressing the securing arm 226 toward the handset 110 to release the locking edge 229 of the locking arm 228 from the locking grooves 227 of the securing arm 226. Next, the locking arm 228 is rotated away from the handset 110, and the spring 225 is allowed to rotate the securing arm 226 away from the handset 110. Next, the operator removes the handset 110 from the holder 108 by sliding the handset 110 and the pivot slide assembly 215 away from the supporting surface 202 and lifting the handset 110 out of the holder 108. After removing the handset 110 from the holder 108, the process is completed at a block 318.

Figure 13A:
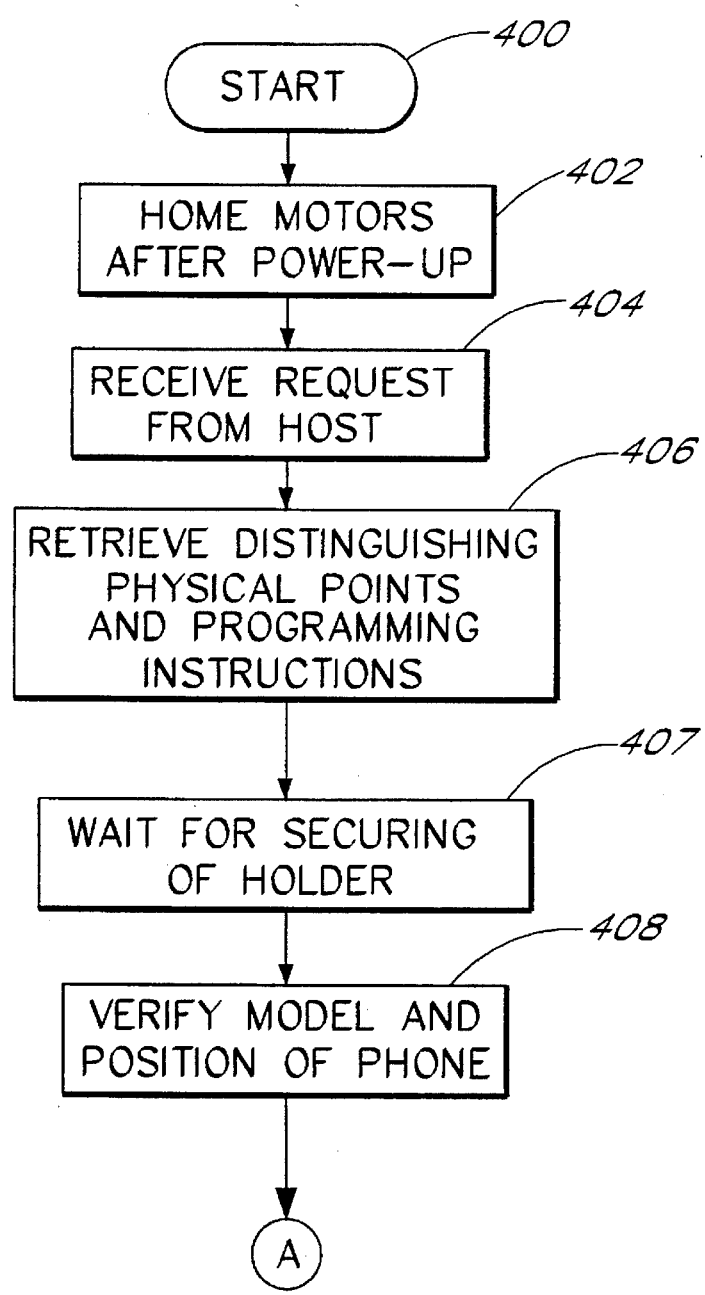
FIGS. 13A and 13B show a flowchart illustrating a method performed by the programming module of the preferred embodiment of the present invention when programming a cellular telephone.
Figure 13B:
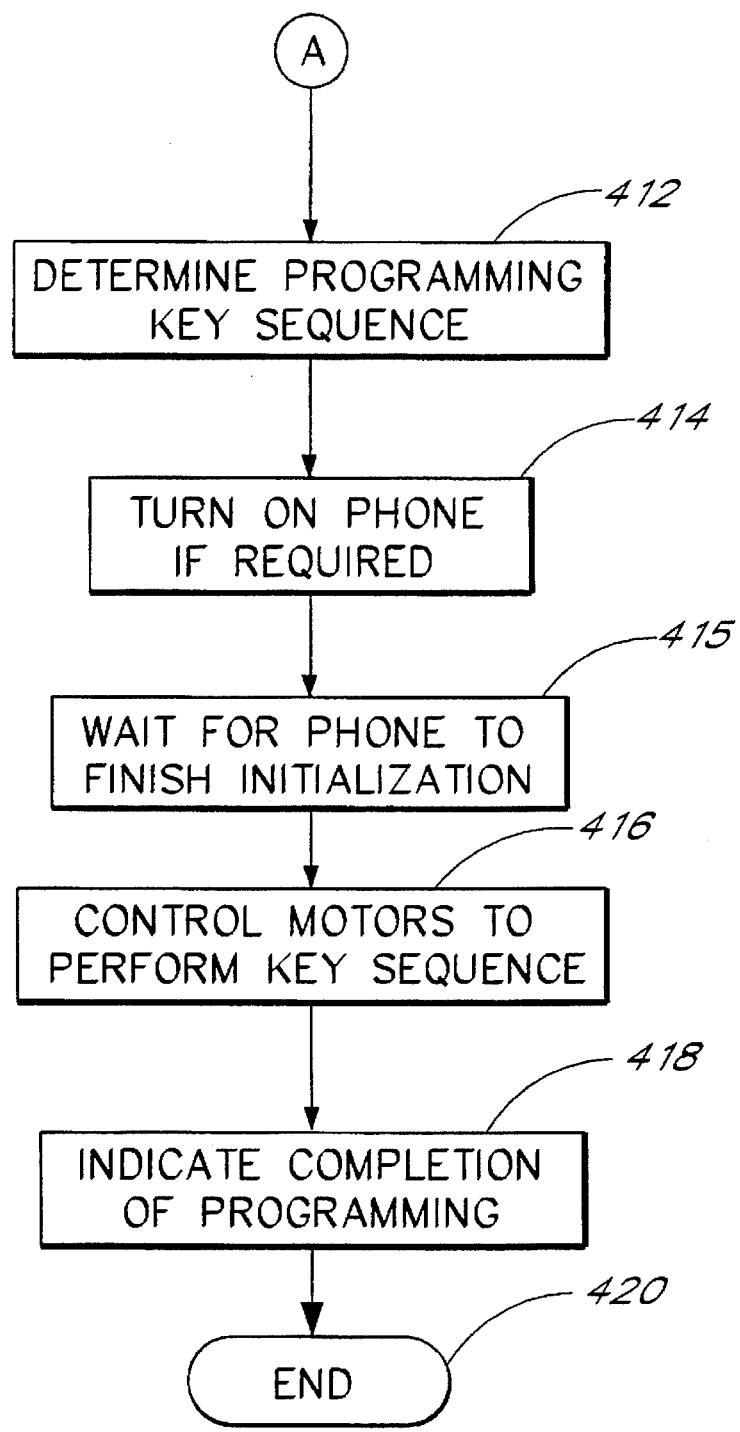

FIGS. 13A and 13B show a flow chart illustrating a method executed by the programming module 114 of the preferred embodiment of the present invention to program a cellular telephone. The method begins at a block 400. At a process block 402, the programming module 114 sends instructions to the motor controllers 103A, 103B, 105A, 105B, 107A, 107B indicating that the motors 208A, 208B, 210A, 210B, 212A, 212B are to be moved to their home positions. The motor controllers 103A, 103B, 105A, 105B, 107A, 107B translate these instructions into electrical signals and transmit these signals to the corresponding motors 208A, 208B, 210A, 210B, 212A, 212B to move them to their home positions. A person of skill in the art will understand the instructions that will be required to control the motors 208A, 208B, 210A, 210B, 212A, 212B through the motor controllers 103A, 103B, 105A, 105B, 107A, 107B, based on the corresponding data sheets. The step of homing the pusher members 112A, 112B is performed sometime after the power is turned on to the programmer 102, and after the programming module 114 has initialized the motor controllers 103A, 103B, 105A, 105B, 107A, 107B.

At a process block 404, the programming module 114 receives a request message from the host computer 100. This message is the same one that was transmitted from the host computer 100 at the process block 306 of FIG. 12. As described above, this message also contains user-specific information required to program the cellular telephone, such as the model number, the telephone number and numerous programming options.

At a process block 406, the programming module 114 refers to a database contained in memory on a hard disk of the programming module 114. Using the model of the cellular telephone to be programmed, the programming module 114 retrieves a set of two or three distinguishing physical points, as well as the model-specific programming information, for the particular model of cellular telephone to be programmed. These distinguishing physical points correspond to locations on the surface of the handset 110 of the cellular telephone. Each of these physical points is also within the range of motion of the pusher member 112. Each model of cellular telephone has its own set of physical points that is preferably unique to the shape of that particular handset. Thus, only one model of cellular telephone has physical points on the surface of the handset 110 that correspond exactly to any given set of two or three distinguishing physical points.

At a process block 407, the programming module 114 waits for a signal from the switch 233 of the holder 108 to indicate that the handset 110 of the telephone has been placed in the holder 108. At a process block 408, the programming module 114 controls the motor assemblies 104A, 104B, through the motor controllers 103A, 103B, 105A, 105B, 107A, 107B, to sequentially move a pusher member 112A, 112B to each of the distinguishing physical points retrieved at the process block 406. The programming module 114 then determines whether the surface of the handset 110 was contacted at the correct location for each of the distinguishing physical points. This step will be described in greater detail below with reference to some process blocks 510, 512, 514, 516, 518, 520 of FIGS. 14A and 14B. Testing each of the distinguishing physical points for the specific model number verifies two different aspects of the programming setup. First, it verifies that the model number entered by the operator corresponds to the model number of the cellular telephone for which the handset 110 is placed in the holder 108. Second, it verifies that the handset 110 has been placed in the correct position and orientation within the holder 108.

At a process block 412, the programming module 114 compares the model-specific programming information, retrieved at the process block 406, with the user-specific programming information, received from the host computer 100, to determine the appropriate sequence of keystrokes required to program the telephone as requested. This step is the same as the procedure currently performed by a clerk when programming a cellular telephone under existing procedures, except that the step is automated in the programming module 114. A person of skill in the art will understand how to follow a manufacturer's programming instructions to determine an appropriate key sequence.

At a process block 414, the programming module 114 accesses the database on the hard drive to determine whether the power button for the telephone is located on the keypad 211 of the handset 110. If so, then the programming module 114 controls the motor assemblies 104A, 104B, through the motor controllers 103A, 103B, 105A, 105B, 107A, 107B, to activate the power button to turn on the cellular telephone. The method for actuating a key on the keypad 211 will be described in greater detail below with reference to FIGS. 14A and 14B. If the power button of the telephone is not on the keypad 211, then the host computer 100 will have prompted the operator to turn on the telephone at the process block 306, which was described above with respect to FIG. 12. At a process block 415, the programming module 114 waits a predetermined period of time, which depends on the model of cellular telephone, to ensure that the cellular telephone has completed its power-up initialization.

At a process block 416, the programming module 114 controls the motor assemblies 104A, 104B, through the motor controllers 103A, 103B, 105A, 105B, 107A, 107B, so that the pusher members 112A, 112B actuate the keys on the keypad 211 in the programming sequence determined above at the process block 412. If only one key on the keypad 211 must be actuated at a particular step in the programming sequence, then either of the pusher members 112A, 112B can be used to actuate the key. However, if the programming sequence requires that two keys be actuated simultaneously, then the appropriate pusher member 112A, 112B for actuating each of the keys must be selected to avoid physical interference between the motor assemblies 104A, 104B. Generally, referring back to FIG. 5, the pusher member 112A is utilized for keys that are closer to the securing post 204 in the X direction and closer to the securing arm 226 in the Y direction. Again, the method for actuating a key on the keypad 211 will be described in greater detail below with reference to FIGS. 14A and 14B. Returning to FIGS. 13A and 13B, the programming module 114 continues to actuate keys on the keypad 211 in the predetermined key sequence until either the sequence has been completed or until an error has been detected. If an error has been detected, then the programming module 114 aborts the programming routine. After either completing or aborting the programming routine, the programming module 114 advances to a process block 418. At this point, the programming module 114 transmits a message to the host computer 100 over the serial interface 101 indicating that the programming module 114 has completed its attempt at programming the cellular telephone, and also indicating whether the attempt was successful. This method executed by the programming module 114 to program a cellular telephone ends at a block 420.

Figure 14A:
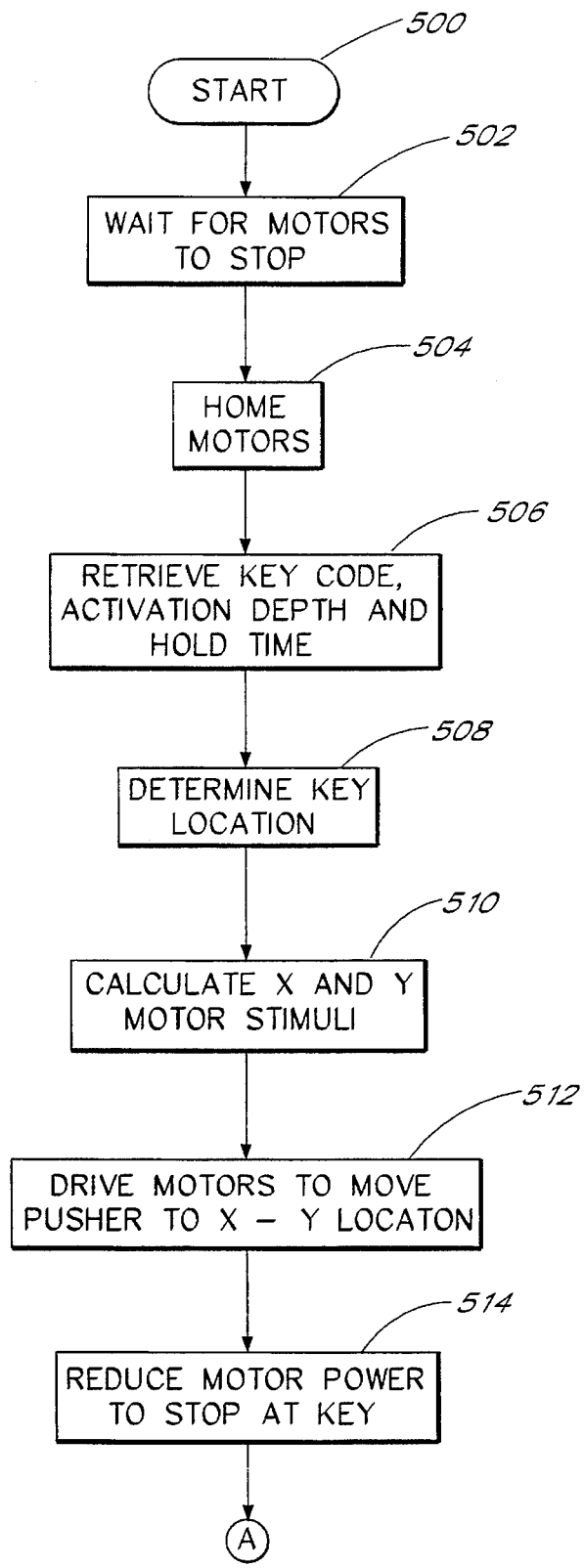
FIGS. 14A and 14B show a flowchart illustrating a method implemented by the programming module and the motor controllers of the preferred embodiment of the present invention for controlling a motor assembly to actuate a key on a cellular telephone handset.
Figure 14B:
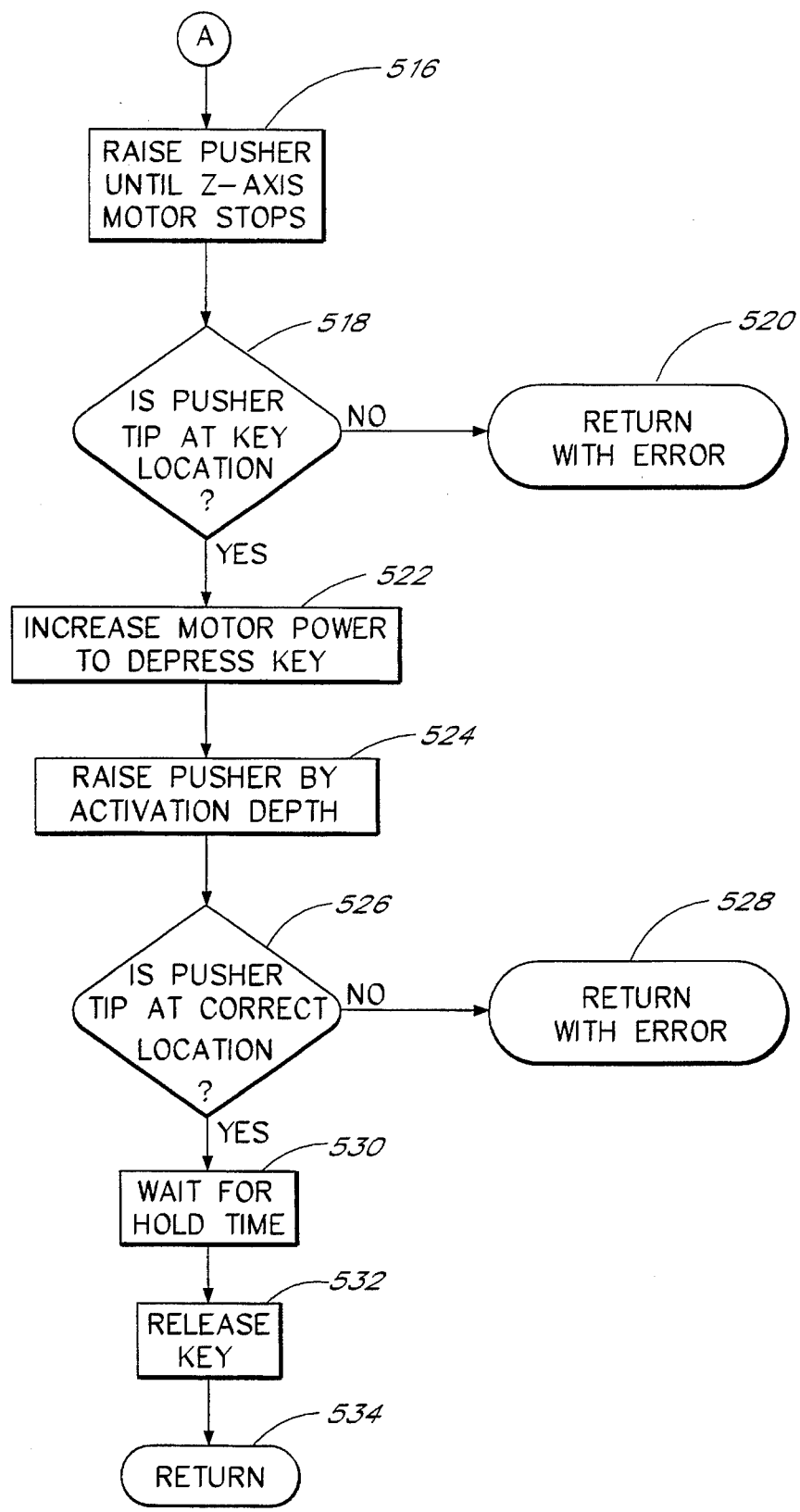

FIGS. 14A and 14B show a flow chart illustrating a method of actuating a key on the keypad 211 of a cellular telephone using a pusher member 112A, 112B. The steps involved in this method are generally the same for either pusher member 112A, 112B. The method begins at a block 500. At a process block 502, the programming module 114 waits until the motor assemblies 104A, 104B have completed any previous actions and have come to a stop. The programming module 114 can determine this condition by monitoring the motor controllers 103A, 103B, 105A, 105B, 107A, 107B, which will indicate whether they are driving the motor assemblies 104A, 104B. At a process block 504, the programming module 114 instructs the motor controllers 103A, 103B, 105A, 105B, 107A, 107B to move the motors 208A, 208B, 210A, 210B, 212A, 212B to their respective home positions. To accomplish this step, the programming module 114 sends values representing a particular three-dimensional coordinate location that has been selected as the home point. The home point should have a low-enough Z-axis coordinate to move the tip of the pusher member 112A, 112B around beneath the handset 211.

At a process block 506, the programming module 114 retrieves the next key code from the programming key sequence determined above at the process block 412 of FIG. 13B. The programming module 114 also determines the amount of time that this key should be actuated, from the same programming key sequence. The programming module 114 also determines the appropriate depth of depression for the key represented by the retrieved key code. This value is obtained from the database on the hard disk.

At a process block 508, the programming module 114 determines the X, Y and Z coordinates for the surface of the particular key to be actuated. Preferably, this step is accomplished by applying the model number of the cellular telephone and the key code of the key to be actuated to an array or table that will produce the corresponding X, Y and Z coordinates. This array or table can be stored on the hard disk of the programming module 114.

At a process block 510, the programming module 114 calculates the rotations required for the X-axis motor 208A, 208B and the Y-axis motor 210A, 210B to place the pusher member 112A, 112B at the required X-Y coordinate location. The rotations required of the X-axis motor 208A and the Y-axis motor 210A, corresponding to the pusher member 112A, differs from the rotations required of the X-axis motor 208B and the Y-axis motor 210B, corresponding to the pusher member 112B. These calculations involve basic trigonometry that will be understood by one of skill in the art. When using stepper motors, the programming module 114 calculates the number of steps required to obtain the required rotations. The programming module 114 sends the results of these calculations to the appropriate motor controllers 103A, 103B, 105A, 105B. The X-axis motor controller 103A, 103B generates a series of electrical pulses to the motor 208A, 208B and the Y-axis motor controller 105A, 105B generates a series of electrical pulses to the motor 210A, 210B, based on the information received from the programming module 114. At a process block 512, these electrical pulses are transmitted to the respective motors 208A, 208B, 210A, 210B. The motors 208A, 208B, 210A, 210B respond to these electrical pulses and move the pusher member 112A, 112B to the appropriate location. If an X-axis limit switch 236 or a Y-axis limit switch 237 is triggered, then a signal is generated to the corresponding motor controller 103A, 103B, 105A, 105B, which sends a signal to the programming module 114. The programming module 114 abandons the programming routine and transmits an error message to the host computer 100 over the serial interface 101. Thus, the limit switches 236 and 237 should be positioned to allow activation of any key on the keypad 211 without triggering the limit switches 236, 237.

At a process block 514, the programming module 114 sends a message to the Z-axis motor controller 107A, 107B indicating that the power for the Z-axis motor 212A, 212B should be reduced to a level that is insufficient to depress a key. As a result, the Z-axis motor controller 107A, 107B reduces the power delivered to the Z-axis motor 212A, 212B. At a process block 516, the programming module 114 transmits a message to the Z-axis motor controller 107A, 107B instructing the motor controller 107A, 107B to raise the pusher member 112A, 112B until the pusher member 112A, 112B stops moving. The pusher member 112A, 112B will stop moving when its tip contacts another surface. Of course, the tip of the pusher member 112A, 112B should make contact with a key on the keypad 211, because the pusher member 112A, 112B has already been positioned at the X-Y coordinates of the next key to be actuated. However, because of the low power level, the pusher member 112A, 112B will stop without even depressing the key. If the pusher member 112A, 112B ever reaches a predefined maximum or minimum Z-axis position, then the programming module 114 will determine this situation based on a signal from the Z-axis motor controller 107A, 107B, which signal will be derived from a signal generated by the Z-axis position sensor 244. In such a situation, the programming module 114 abandons the programming process with an error condition.

At a process block 518, the Z-axis motor controller 107A, 107B determines when the pusher member 112A, 112B has stopped moving by monitoring the signal generated by the Z-axis position sensor 244. When the pusher member 112A, 112B is moving, the magnitude of the signal from the Z-axis position sensor 244 will vary as the tapered notch 115 moves through the Z-axis position sensor 244, blocking a varying amount of light. However, when the pusher member 112A, 112B stops moving, then the magnitude of the signal from the Z-axis position sensor 244 will remain constant. Thus, by determining when the signal from the Z-axis position sensor 244 has stopped changing, the motor controller 107A, 107B can determine when the pusher member 112A, 112B has stopped moving. If there is no movement by the pusher member 112A, 112B when the motor 212A, 212B is driving the pusher member 112A, 112B, then the pusher member 112A, 112B must be contacting another surface. Next, the motor controller 107A, 107B can determine the position of the tip of the pusher member 112A, 112B based on the constant magnitude of the signal from the Z-axis position sensor 244. The motor controller 107A, 107B communicates the corresponding Z-axis coordinate of the pusher member 112A, 112B to the programming module 114. The programming module 114 compares this value to the expected Z-axis coordinate of the key to be actuated. If these two values are not within a predefined tolerance, then the method proceeds to a block 520. At that point, the programming module 114 abandons the programming routine and transmits an error message to the host computer 100 over the serial interface 101. If the actual Z-axis coordinate corresponds to the expected Z-axis coordinate, then the programming module 114 advances to a process block 522.

Referring back to FIG. 13A, at the process block 408 the programming module 114 controls one of the pusher members 112A, 112B to contact two or three distinguishing physical points on the surface of the cellular telephone. This is accomplished in a manner that is similar to the steps described above with reference to the process blocks 510, 512, 514, 516 and 518. Specifically, at the process block 408, the programming module 114 activates the X-axis motor 208A, 208B, through the motor controller 103A, 103B, and the Y-axis motor 210A, 210B, through the motor controller 105A, 105B, to move the pusher member 112A, 112B to the appropriate X-Y coordinate location. Next, the programming module 114 reduces the power of the Z-axis motor 212A, 212B, through the motor controller 107A, 107B, to a level that is insufficient to depress a key on the keypad 211. Next, the programming module 114 activates the Z-axis motor 212A, 212B, through the motor controller 107A, 107B, to raise the pusher member 112A, 112B until the Z-axis motor 212A, 212B stops. The motor controller 107A, 107B now determines the position of the tip of the pusher member 112A, 112B by monitoring the signal from the Z-axis position sensor 244, and communicates the Z-axis coordinate to the programming module 114. The programming module 114 then compares this position with the Z-axis coordinate of the current distinguishing physical point.

Referring again to FIGS. 14A and 14B, the process blocks 514, 516 and 518 define a method for sensing contact between the pusher member 112A, 112B and another surface. Generally, this method comprises the steps of reducing the power supplied to the Z-axis motor 212A, 212B, raising the pusher member 112A, 112B until it stops moving, sensing when the pusher member 112A, 112B has stopped moving, and determining the Z-axis position of the pusher member 112A, 112B after it has stopped moving. There are numerous other methods by which the programmer 102 can sense contact between the pusher member 112A, 112B and another surface, such as a key of the keypad 211. For example, the programming module 114 can determine when the pusher member 112A, 112B has stopped moving by having the Z-axis motor controller 107A, 107B sense the power consumed by the Z-axis motor 212A, 212B, instead of having the Z-axis motor controller 107A, 107B monitor the signal from the Z-axis position sensor 244. When the pusher member 112A, 112B contacts another surface while being driven at low power, the motor 212A, 212B stalls and the power consumption of the motor 212A, 212B is substantially reduced. Thus, the motor controller 107A, 107B can determine when the pusher member 112A, 112B has stopped moving by detecting a drop in power consumption by the motor 212A, 212B. Also, the programming module 114 can determine when the pusher member 112A, 112B has stopped moving by monitoring a signal from a sensor mounted at the tip of the pusher member 112A, 112B that will indicate when the sensor has contacted another surface, again instead of having the Z-axis motor controller 107A, 107B monitor the signal from the Z-axis position sensor 244. In addition, the programming module 114 can determine the Z-axis position of the pusher member 112A, 112B after the pusher member 112A, 112B has stopped moving by having the Z-axis motor controller 107A, 107B count the number of pulses that were applied to the motor 212A, 212B before the pusher member 112A, 112B stopped moving, instead of checking the signal generated by the Z-axis position sensor 244. The motor controller 107A, 107B can provide this number of pulses to the programming module 114. The programming module 114 can calculate the Z-axis coordinate that should result from applying the indicated number of pulses to the motor 212A, 212B, and use this Z-axis coordinate as the actual position of the pusher member 112A, 112B. A person of skill in the art will also know of additional methods of sensing contact with another surface.

At the process block 522, the programming module 114 increases the power supplied to the Z-axis motor 212A, 212B to a level that is sufficient to depress a key. At a process block 524, the programming module 114 instructs the Z-axis motor controller 107A, 107B to raise the pusher member 112A, 112B by an amount corresponding to the activation depth of the key, as retrieved at the process block 506 of FIG. 14A. The motor controller 107A, 107B generates pulses to the Z-axis motor 212A, 212B to move the pusher member 112A, 112B the appropriate distance.

At a process block 526, the programming module 114 determines the new position of the pusher member 112A, 112B, and compares this actual position with the expected position of the pusher member 112A, 112B, based on the position and the activation depth of the key. If these two numbers are not within a predefined tolerance, the programming module 114 advances to a block 528, abandons the programming routine and returns an error message to the host computer 100 over the serial interface 101.

If the two values compared at the decision block 526 are within the predefined tolerance, then the desired key has been actuated and the programming module 114 advances to a process block 530. At this point, the programming module 114 delays for a period of time that is equal to the hold time that was retrieved at the process block 506 of FIG. 14A. Thus, the programming module 114 holds the key in a depressed state for the required period of time. Next, the programming module 114 advances to a process block 532. At this point, the programming module 114 instructs the Z-axis motor controller 107A, 107B to lower the pusher member 112A, 112B. The motor controller 107A, 107B generates the appropriate pulses to the Z-axis motor 212A, 212B to lower the pusher member 112A, 112B. The method of actuating a key on the keypad 211 is now complete at a block 534.

We claim:

1. A cellular telephone programmer for actuating keys on a handset of a cellular telephone in a prescribed sequence to prepare the telephone for operation in a cellular system, said programmer comprising:

a memory for retaining programming information related to the model of cellular telephone to be programmed;

a pusher member for mechanically actuating a plurality of keys on the handset of the cellular telephone;

a holder for securing the handset in a position that enables said pusher member to actuate keys on the handset;

a driver attached to said pusher member; and a programming module electrically connected to said driver, said module retrieving programming information from said memory and instructing said driver to move said pusher member to press keys on the handset in accordance with the prescribed sequence.

2. The programmer of claim 1, wherein said driver comprises a motor assembly and a motor controller, said motor assembly comprising three motors for driving said pusher member in three spacial dimensions.

3. The programmer of claim 1, wherein said programmer additionally comprises a second pusher member for mechanically actuating keys on the handset of the cellular telephone and a second driver attached to said second pusher member; and wherein said programming module is electrically connected to said second driver and said programming module instructs said second driver to move said second pusher member to press keys on the handset in accordance with the prescribed sequence.

4. The programmer of claim 1 additionally comprising means for sensing contact between said pusher member and another surface, wherein said programming module is responsive to said means for sensing contact.

5. The programmer of claim 1, wherein said programming module is responsive to information received from an input device, said programming module using the information received from the input device to determine instructions for said driver.

6. A cellular telephone programmer for actuating keys on a handset of a cellular telephone, said programmer comprising:

a pusher member for mechanically actuating keys on the handset of the cellular telephone;

a driver attached to said pusher member, said driver driving said pusher member in three spatial dimensions to allow said pusher member to sequentially actuate multiple keys on any of a plurality of different handsets corresponding to different models of cellular telephones, wherein the different handsets have different keypad configurations; and a programming module connected to said driver which generates electrical signals to control said driver to move said pusher member to actuate keys on the handset.

7. The cellular telephone programmer of claim 6, wherein said driver comprises:

a first motor;

a second motor; and a third motor.

8. The cellular telephone programmer of claim 7, wherein said first motor drives a rack and pinion device for moving said second motor, said third motor and said pusher member in a substantially longitudinal direction; wherein said second motor rotates said third motor and said pusher member in a substantially horizontal direction along an arc centered at said second motor; and wherein said third motor moves said pusher member in a substantially vertical direction.

9. The cellular telephone programmer of claim 7, wherein said first motor drives said pusher member in a first linear direction, wherein said second motor drives said pusher member in a rotational direction, and wherein said third motor drives said pusher member in a second linear direction, said second linear direction being substantially perpendicular to said first linear direction and to said rotational direction.

10. The cellular telephone programmer of claim 9, wherein said first motor has a tolerance of no greater than 1/16 inch in positioning said pusher member, wherein said second motor has a tolerance of no greater than 1/16 inch in positioning said pusher member, and wherein said third motor has a tolerance of no greater than 1/16 inch in positioning said pusher member.

11. The cellular telephone programmer of claim 6, wherein said programming module comprises a memory for retaining model-specific programming information and user-specific programming information and an input device for receiving user-specific programming information for retention in said memory, and wherein said programming module generates the electrical signals in response to said model-specific programming information and said user-specific programming information.

12. A cellular telephone programmer for actuating keys on a handset of a cellular telephone, said programmer comprising:

a pusher member for actuating keys on the handset of the cellular telephone;

means for sensing contact between said pusher member and another surface;

a driver attached to said pusher member; and a programming module to control said driver to move said pusher member to actuate keys on the handset, said programming module being responsive to said means for sensing contact between said pusher member and another surface.

13. The cellular telephone programmer of claim 12, wherein said driver comprises a motor, wherein said means for sensing contact between said pusher member and another surface comprises said motor, wherein said motor stops moving said pusher member when said pusher member contacts another surface, and wherein said means for sensing contact between said pusher member and another surface additionally comprises means for sensing when said motor has stopped moving said pusher member.

14. The cellular telephone programmer of claim 12, wherein said means for sensing contact between said pusher member and another surface comprises a sensor mounted at a tip of said pusher member.

15. A cellular telephone programmer for actuating keys on a handset of a cellular telephone, said programmer comprising:

a pusher member for actuating keys on the handset of the cellular telephone;

a driver attached to said pusher member;

a programming module which generates electrical signals to control said driver to move said pusher member to actuate keys on the handset; and a holder which secures the cellular telephone handset in a position that enables said pusher to actuate keys on the handset.

16. The cellular telephone programmer of claim 15, wherein said variety of handsets vary in length, width and height.

17. The cellular telephone programmer of claim 15, wherein said holder is adjustable in three dimensions to accommodate different lengths, widths and heights of handsets.

18. The cellular telephone programmer of claim 17, wherein said holder comprises:

a first supporting surface for restraining said handset in a first direction;

a first movable pressing surface for securing said handset against said first supporting surface to restrain said handset in said first direction;

a second supporting surface for restraining said handset in a second direction;

a third supporting surface for restraining said handset in a third direction; and a second movable pressing surface for securing said handset against said second supporting surface and against said third supporting surface to restrain said handset in said second and third directions.

19. The cellular telephone programmer of claim 18, wherein said first movable pressing surface moves in a substantially longitudinal direction and wherein said second movable pressing surface moves in a rotational direction substantially perpendicular to said longitudinal direction.

20. An apparatus for programming any cellular telephone within a group of cellular telephones that have dissimilar handset configurations, said apparatus comprising:

a pusher member adapted to mechanically actuate keys on the handset of any cellular telephone within said group of cellular telephones; and a handset holder having at least one member which applies a retention force to the handset, said holder being configured (i) to apply said retention force to the handset of any cellular telephone within said group of cellular telephones, and (ii) to retain the handset in a fixed position for actuation of the keys by the pusher member.

21. The apparatus of claim 20, wherein said holder is configured to reproducedly mount each handset within said group such that the keys of any given handset in said group will occupy the same spatial position within said holder each time the handset is mounted in the holder.

22. The apparatus of claim 21, additionally comprising a controller which controls the movement of said pusher member, said controller having a memory containing information defining said spatial position of the keys of the handset mounted in the holder.

23. An apparatus for programming a selected cellular telephone within a group of cellular telephones, said apparatus comprising:

a first pusher member configured to depress keys of said telephones; and a second pusher member configured to depress keys of said telephones, each of said pusher members being mounted (i) for rotation along an arc, and (ii) for translation in each of two generally orthogonal directions.

24. The apparatus of claim 23, additionally comprising a holder which secures the handset of any cellular telephone within the group of cellular telephones in a position that enables its keys to be pushed by the pusher members.

25. The apparatus of claim 24, additionally comprising a controller for controlling movement of said pusher members, said controller having a memory which stores information corresponding to the keypad configuration for each of the handsets of cellular telephones within said group of cellular telephones, said controller utilizing said information to move said pusher members to spatial positions that contact selected keys of the keypad when the handset is mounted in said holder.

* * * * *